(12) United States Patent
Zorkendorfer et al.

(10) Patent No.: US 8,090,130 B2
(45) Date of Patent: Jan. 3, 2012

(54) HIGHLY PORTABLE MEDIA DEVICES

(75) Inventors: Rico Zorkendorfer, San Francisco, CA (US); Stephen Brian Lynch, Alamo, CA (US); Dinesh Mathew, Fremont, CA (US); Jonathan P. Ive, San Francisco, CA (US); Stephen Paul Zadesky, Portola Valley, CA (US); Evans Hankey, San Francisco, CA (US); Christopher David Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1288 days.

(21) Appl. No.: 11/739,489

(22) Filed: Apr. 24, 2007

(65) Prior Publication Data

US 2008/0065246 A1 Mar. 13, 2008

Related U.S. Application Data

(60) Provisional application No. 60/844,128, filed on Sep. 11, 2006.

(51) Int. Cl.
*H04R 1/02* (2006.01)
*H04R 9/06* (2006.01)

(52) U.S. Cl. ............ 381/334; 24/3.11; 704/272; 700/94

(58) Field of Classification Search .................. 381/333, 381/334; 715/830; 24/3.1, 3.11, 3.12; 710/303; 700/94; 704/272, 278
See application file for complete search history.

(56) References Cited

U.S. PATENT DOCUMENTS

| | | | |
|---|---|---|---|
| 4,090,216 A | 5/1978 | Constable | |
| 4,386,345 A | 5/1983 | Narveson et al. | |
| 4,451,849 A | 5/1984 | Fuhrer | |
| 4,589,022 A | 5/1986 | Prince et al. | |
| 4,908,523 A | 3/1990 | Snowden et al. | |
| 4,928,307 A | 5/1990 | Lynn | |
| 4,951,171 A | 8/1990 | Tran et al. | |
| 5,185,906 A | 2/1993 | Brooks | |
| 5,293,494 A | 3/1994 | Saito et al. | |
| 5,379,057 A | 1/1995 | Clough | |
| 5,406,305 A | 4/1995 | Shimomura et al. | |
| 5,528,770 A * | 6/1996 | Castilla et al. | 340/7.63 |
| 5,559,945 A | 9/1996 | Beaudet et al. | |
| 5,566,337 A | 10/1996 | Szymanski et al. | |
| 5,583,993 A | 12/1996 | Foster et al. | |
| 5,608,698 A | 3/1997 | Yamanoi et al. | |
| 5,616,876 A | 4/1997 | Cluts | |
| 5,617,386 A | 4/1997 | Choi | |
| 5,670,985 A | 9/1997 | Cappels, Sr. et al. | |
| 5,675,362 A | 10/1997 | Clough | |
| 5,684,513 A | 11/1997 | Decker | |

(Continued)

FOREIGN PATENT DOCUMENTS

DE 43 34 773 A1 4/1994

(Continued)

OTHER PUBLICATIONS

Submission pursuant to *Apple Inc* v. *Burst Inc.*, 3:06-CV-00019 MHP (Northern District of California).

(Continued)

*Primary Examiner* — Xu Mei

(74) *Attorney, Agent, or Firm* — Womble Carlyle Sandridge & Rice LLP

(57) ABSTRACT

An improved portable media device and methods for operating a media device are disclosed.

52 Claims, 12 Drawing Sheets

U.S. PATENT DOCUMENTS

| | | | |
|---|---|---|---|
| 5,710,922 | A | 1/1998 | Alley et al. |
| 5,712,949 | A | 1/1998 | Kato et al. |
| 5,717,422 | A | 2/1998 | Fergason |
| 5,721,949 | A | 2/1998 | Smith et al. |
| 5,726,672 | A | 3/1998 | Hernandez et al. |
| 5,739,451 | A | 4/1998 | Winksy et al. |
| 5,740,143 | A | 4/1998 | Suetomi |
| 5,760,588 | A | 6/1998 | Bailey |
| 5,778,374 | A | 7/1998 | Dang et al. |
| 5,791,019 | A | 8/1998 | Jeong |
| 5,803,786 | A | 9/1998 | McCormick |
| 5,815,225 | A | 9/1998 | Nelson |
| 5,822,288 | A | 10/1998 | Shinada |
| 5,835,721 | A | 11/1998 | Donahue et al. |
| 5,835,732 | A | 11/1998 | Kikinis et al. |
| 5,838,969 | A | 11/1998 | Jacklin et al. |
| 5,864,868 | A | 1/1999 | Contois |
| 5,867,163 | A | 2/1999 | Kurtenbach |
| 5,870,710 | A | 2/1999 | Ozawa et al. |
| 5,918,303 | A | 6/1999 | Yamaura et al. |
| 5,920,728 | A | 7/1999 | Hallowell et al. |
| 5,923,757 | A | 7/1999 | Hocker et al. |
| 5,952,992 | A | 9/1999 | Helms |
| 6,006,274 | A | 12/1999 | Hawkins et al. |
| 6,009,237 | A | 12/1999 | Hirabayashi et al. |
| 6,011,585 | A | 1/2000 | Anderson |
| 6,018,705 | A | 1/2000 | Gaudet et al. |
| 6,041,023 | A | 3/2000 | Lakhansingh |
| 6,052,654 | A | 4/2000 | Gaudet et al. |
| 6,108,426 | A | 8/2000 | Stortz |
| 6,122,340 | A | 9/2000 | Darley et al. |
| 6,158,019 | A | 12/2000 | Squibb |
| 6,161,944 | A | 12/2000 | Leman |
| 6,172,948 | B1 | 1/2001 | Keller et al. |
| 6,179,432 | B1 | 1/2001 | Zhang et al. |
| 6,185,163 | B1 | 2/2001 | Bickford et al. |
| 6,191,939 | B1 | 2/2001 | Burnett |
| 6,208,044 | B1 | 3/2001 | Viswanadham et al. |
| 6,216,131 | B1 | 4/2001 | Liu et al. |
| 6,217,183 | B1 | 4/2001 | Shipman |
| 6,248,946 | B1 | 6/2001 | Dwek |
| 6,295,541 | B1 | 9/2001 | Bodnar et al. |
| 6,297,795 | B1 | 10/2001 | Kato et al. |
| 6,298,314 | B1 | 10/2001 | Blackadar et al. |
| 6,332,175 | B1 | 12/2001 | Birrell et al. |
| 6,336,365 | B1 | 1/2002 | Blackadar et al. |
| 6,336,727 | B1 | 1/2002 | Kim |
| 6,341,316 | B1 | 1/2002 | Kloba et al. |
| 6,357,147 | B1 | 3/2002 | Darley et al. |
| 6,377,530 | B1 | 4/2002 | Burrows |
| 6,452,610 | B1 | 9/2002 | Reinhardt et al. |
| 6,467,924 | B2 | 10/2002 | Shipman |
| 6,493,652 | B1 | 12/2002 | Ohlenbusch et al. |
| 6,536,139 | B2 | 3/2003 | Darley et al. |
| 6,549,497 | B2 | 4/2003 | Miyamoto et al. |
| 6,560,903 | B1 | 5/2003 | Darley |
| 6,587,403 | B1 | 7/2003 | Keller et al. |
| 6,587,404 | B1 | 7/2003 | Keller et al. |
| 6,605,038 | B1 | 8/2003 | Teller et al. |
| 6,606,281 | B2 | 8/2003 | Cowgill et al. |
| 6,611,607 | B1 | 8/2003 | Davis et al. |
| 6,611,789 | B1 | 8/2003 | Darley |
| 6,617,963 | B1 | 9/2003 | Watters et al. |
| 6,621,768 | B1 | 9/2003 | Keller et al. |
| 6,623,427 | B2 | 9/2003 | Mandigo |
| 6,631,101 | B1 | 10/2003 | Chan et al. |
| 6,693,612 | B1 | 2/2004 | Arakawa et al. |
| 6,731,312 | B2 | 5/2004 | Robbin |
| 6,738,852 | B1 * | 5/2004 | Osborn ........................ 710/303 |
| 6,760,536 | B1 | 7/2004 | Amir et al. |
| 6,762,741 | B2 | 7/2004 | Weindorf |
| 6,781,611 | B1 | 8/2004 | Richard |
| 6,794,566 | B2 | 9/2004 | Pachet |
| 6,799,226 | B1 | 9/2004 | Robbin et al. |
| 6,801,964 | B1 | 10/2004 | Mahdavi |
| 6,832,373 | B2 | 12/2004 | O'Neill |
| 6,844,511 | B1 | 1/2005 | Hsu et al. |
| 6,870,529 | B1 | 3/2005 | Davis |
| 6,871,063 | B1 | 3/2005 | Schiffer |
| 6,876,947 | B1 | 4/2005 | Darley et al. |
| 6,882,955 | B1 | 4/2005 | Ohlenbusch et al. |
| 6,886,749 | B2 | 5/2005 | Chiba et al. |
| 6,898,550 | B1 | 5/2005 | Blackadar et al. |
| 6,911,971 | B2 | 6/2005 | Suzuki et al. |
| 6,918,677 | B2 | 7/2005 | Shipman |
| 6,931,377 | B1 | 8/2005 | Seya |
| 6,934,812 | B1 | 8/2005 | Robbin et al. |
| 6,950,087 | B2 | 9/2005 | Knox et al. |
| 7,010,365 | B2 | 3/2006 | Maymudes |
| 7,028,096 | B1 | 4/2006 | Lee |
| 7,046,230 | B2 | 5/2006 | Zadesky |
| 7,062,225 | B2 | 6/2006 | White |
| 7,076,561 | B1 | 7/2006 | Rosenberg et al. |
| 7,084,856 | B2 | 8/2006 | Huppi |
| 7,084,921 | B1 | 8/2006 | Ogawa |
| 7,092,946 | B2 | 8/2006 | Bodnar |
| 7,124,125 | B2 | 10/2006 | Cook et al. |
| 7,131,059 | B2 | 10/2006 | Obrador |
| 7,143,241 | B2 | 11/2006 | Hull |
| 7,146,437 | B2 | 12/2006 | Robbin et al. |
| 7,171,331 | B2 | 1/2007 | Vock et al. |
| 7,191,244 | B2 | 3/2007 | Jennings et al. |
| 7,213,228 | B2 | 5/2007 | Putterman |
| 7,234,026 | B2 | 6/2007 | Robbin et al. |
| 7,277,928 | B2 | 10/2007 | Lennon |
| 7,301,857 | B2 | 11/2007 | Shah et al. |
| 7,356,679 | B1 | 4/2008 | Le et al. |
| 7,508,535 | B2 | 3/2009 | Hart et al. |
| 7,899,494 | B2 * | 3/2011 | Lee et al. ........................ 455/557 |
| 2001/0013983 | A1 | 8/2001 | Izawa et al. |
| 2001/0029178 | A1 | 10/2001 | Criss et al. |
| 2001/0037367 | A1 | 11/2001 | Iyer |
| 2001/0041021 | A1 | 11/2001 | Boyle et al. |
| 2001/0042107 | A1 | 11/2001 | Palm |
| 2002/0002413 | A1 | 1/2002 | Tokue |
| 2002/0013784 | A1 | 1/2002 | Swanson |
| 2002/0028683 | A1 | 3/2002 | Banatre et al. |
| 2002/0045961 | A1 | 4/2002 | Gibbs et al. |
| 2002/0046315 | A1 | 4/2002 | Miller et al. |
| 2002/0055934 | A1 | 5/2002 | Lipscomb et al. |
| 2002/0059440 | A1 | 5/2002 | Hudson et al. |
| 2002/0059499 | A1 | 5/2002 | Hudson |
| 2002/0090912 | A1 | 7/2002 | Cannon et al. |
| 2002/0116082 | A1 | 8/2002 | Gudorf |
| 2002/0116517 | A1 | 8/2002 | Hudson et al. |
| 2002/0122031 | A1 | 9/2002 | Maglio et al. |
| 2002/0123359 | A1 | 9/2002 | Wei et al. |
| 2002/0152045 | A1 | 10/2002 | Dowling et al. |
| 2002/0156833 | A1 | 10/2002 | Maurya et al. |
| 2002/0161865 | A1 | 10/2002 | Nguyen |
| 2002/0173273 | A1 | 11/2002 | Spurgat et al. |
| 2002/0189426 | A1 | 12/2002 | Hirade et al. |
| 2002/0189429 | A1 | 12/2002 | Qian et al. |
| 2002/0199043 | A1 | 12/2002 | Yin |
| 2003/0002688 | A1 | 1/2003 | Kanevsky et al. |
| 2003/0007001 | A1 | 1/2003 | Zimmerman |
| 2003/0018799 | A1 | 1/2003 | Eyal |
| 2003/0037254 | A1 | 2/2003 | Fischer et al. |
| 2003/0046434 | A1 | 3/2003 | Flanagin et al. |
| 2003/0050092 | A1 | 3/2003 | Yun |
| 2003/0074457 | A1 | 4/2003 | Kluth |
| 2003/0076301 | A1 | 4/2003 | Tsuk et al. |
| 2003/0076306 | A1 | 4/2003 | Zadesky |
| 2003/0079038 | A1 | 4/2003 | Robbin et al. |
| 2003/0095096 | A1 * | 5/2003 | Robbin et al. ................ 345/156 |
| 2003/0097379 | A1 | 5/2003 | Ireton |
| 2003/0104835 | A1 | 6/2003 | Douhet |
| 2003/0127307 | A1 | 7/2003 | Liu et al. |
| 2003/0128192 | A1 | 7/2003 | van Os |
| 2003/0133694 | A1 | 7/2003 | Yeo |
| 2003/0153213 | A1 | 8/2003 | Siddiqui et al. |
| 2003/0156503 | A1 | 8/2003 | Schilling et al. |
| 2003/0167318 | A1 | 9/2003 | Robbin et al. |
| 2003/0176935 | A1 | 9/2003 | Lian et al. |
| 2003/0182100 | A1 | 9/2003 | Plastina et al. |
| 2003/0221541 | A1 | 12/2003 | Platt |
| 2003/0229490 | A1 | 12/2003 | Etter |

| Publication No. | Date | Inventor |
|---|---|---|
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1 | 9/2005 | Kopra et al. |
| 2005/0218303 A1 | 10/2005 | Poplin |
| 2005/0234983 A1 | 10/2005 | Plastina et al. |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0076375 A1 | 4/2006 | Bhakta |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0153040 A1 | 7/2006 | Girish et al. |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 A2 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 11-44789 | 2/1999 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2002-222587 | 8/2002 |
| JP | 2003-124643 | 4/2003 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-79061 | 3/2004 |
| JP | 2004-219731 | 8/2004 |
| JP | 2004-220420 | 8/2004 |
| JP | 2004-296163 | 10/2004 |
| JP | 2005-72005 | 3/2005 |
| JP | 2006/172419 | 6/2006 |
| KR | 20010076508 | 8/2001 |
| KR | 20-0416755 | 5/2006 |
| WO | WO 01/33569 | 6/1995 |
| WO | WO 95/16950 | 6/1995 |
| WO | 98/17032 | 4/1998 |
| WO | WO 99/28813 | 6/1999 |
| WO | WO 00/22820 | 4/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO2004/084413 A2 | 9/2004 |
| WO | 2004/098079 | 11/2004 |
| WO | WO 2004/104815 | 12/2004 |

| | | |
|---|---|---|
| WO | WO 2005/031737 | 4/2005 |
| WO | 2005/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |
| WO | 2006/073891 | 7/2006 |

OTHER PUBLICATIONS

Office Action in European Patent Application No. 05 855 368.6 dated Nov. 20, 2008.
Apple iTunes Smart Playlists, downloaded Apr. 5, 2005 from http://web.archive.org/web/20031002011316/www.apple.com/itunes/smartplaylists... pp. 1-2.
International Search Report dated Dec. 5, 2007 in PCT Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes; Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in PCT Application No. PCT/US2007/004810.
Written Opinion dated Dec. 5, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How to Do Everything With Your iPod and iPod Mini"., 2004, McGraw-Hill Professional, p. 33.
Office Action dated Feb. 4, 2008 in U.S. Appl. No. 11/566,072.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Jun. 17, 2008 in U.S. Appl. No. 11/212,313.
Office Action dated May 30, 2008 in Chinese Patent Application No. 02825938.6.
Office Action dated Oct. 16, 2008 in U.S. Appl. No. 11/327,544.
Office Action in Japanese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association for Computing Machinery, Conference Proceedings, Apr. 5, 2003.
Office Action dated Mar. 9, 2010 in U.S. Appl. No. 11/519,352.
Office Action dated Dec. 11, 2009 in U.S. Appl. No. 11/519,352.
Written Opinion dated Oct. 10, 2008 in PCT Application No. PCT/US2007/077160.
Notice of Allowance dated Jun. 15, 2009 in U.S. Appl. No. 11/212,313.
Office Action dated Mar. 24, 2010 in U.S. Appl. No. 11/583,199.
Office Action dated Mar. 25, 2010 in U.S. Appl. No. 11/297,032.
Office Action dated Mar. 10, 2010 in U.S. Appl. No. 11/583,327.
Office Action dated Mar. 11, 2010 in U.S. Appl. No. 11/830,746.
Office Action dated Mar. 4, 2010 in U.S. Appl. No. 11/324,863.
Office Action dated Sep. 10, 2009 in U.S. Appl. No. 11/746,548.
Office Action dated Dec. 16, 2009 in U.S. Appl. No. 11/746,548.
Office Action dated Sep. 3, 2009 in U.S. Appl. No. 11/324,863.
Office Action dated Sep. 2, 2009 in U.S. Appl. No. 11/515,270.
Office Action dated Nov. 16, 2009 in U.S. Appl. No. 11/439,613.
Office Action dated Feb. 3, 2010 in U.S. Appl. No. 11/439,613.
Office Action dated Dec. 14, 2009 in U.S. Appl. No. 11/535,646.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/144,541.
Office Action dated May 29, 2009 in EP Application No. 06 847 856.9.
Examination Report dated Sep. 1, 2009 in Singapore Application No. 200701865-8.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Office Action dated Feb. 2, 2010 in Australian Application No. 2007296755.
Wandt et al. "Combination Belt Clip Leaf Spring and Housing Latch" Motorola Technical Developments, Motorola Inc., Schaumberg, Illinois, US, vol. 18, Mar. 1, 1993, pp. 67-68, XP00349562, ISSN: 0887-5286.
Great Britain Office Action dated Nov. 30, 2010 from Great Britain Application No. 0905051.9.
Japanese Office Action dated Feb. 3, 2011 from Japanese Application No. 2009-527497.
Search Report and Written Opinion in corresponding Singapore Application No. 200900149-6, dated Jun. 17, 2010.
Office Action dated Jun. 2, 2009 in U.S. Appl. No. 11/530,773.
Office Action dated May 11, 2009 in U.S. Appl. No. 11/680,580.
Notice of Allowance dated Apr. 21, 2009 in U.S. Appl. No. 11/327,544.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009 in Singapore Application No. 200701865-8.
Office Action dated Mar. 30, 2009 in U.S. Appl. No. 11/515,270.
Office Action dated Apr. 9, 2009 in U.S. Appl. No. 11/583,199.
Office Action dated May 27, 2009 in U.S. Appl. No. 11/439,613.
Office Action dated Jun. 24, 2009 in U.S. Appl. No. 11/373,468.
Office Action dated Jun. 22, 2009 in U.S. Appl. No. 11/515,270.
Office Action dated Jun. 24, 2009 in U.S. Appl. No. 11/519,352.
Chinese Notification of the First Office Action dated Nov. 15, 2010 from corresponding Chinese Application No. 200780032715.3.
Notice of Preliminary Rejection in corresponding Korean Patent Application No. 10-2009-7006789, mailed Nov. 12, 2010 (with translation).
"Apple Announces iTunes 2," Press Release, Apple Computer, Inc., Oct. 23, 2001.
"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"12.1" 925 Candela Mobile PC, downloaded from LCDHardware.com on Dec. 19, 2002, http://www.lcdharware.com/panel/12_1_panel/default.asp.

"BL82 Series Backlit Keyboards", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].

"Digital Still Cameras—Downloading Images to a Computer," Mimi Chakarova et al., Multi-Media Reporting and Convergence, 2 pgs.

"Eluminx Illuminated Keyboard", downloaded Dec. 19, 2002, http://www.elumix.com/.

"How to Pair a Bluetooth Headset & Cell Phone", About.com; downloaded on Apr. 29, 2006 from http://mobileoffice.about.com/od/usingyourphone/ht/blueheadset_p.htm.

"Peripherals for Industrial Keyboards & Pointing Devices", Stealth Computer Corporation, downloaded on Dec. 19, 2002, http://www.stealthcomputer.com/peropherals_oem.htm.

"Poly-Optical Fiber Optic Membrane Switch Backlighting", downloaded Dec. 19, 2002, http://www.poly-optical.com/membrane_switches.html.

"Public Safety Technologies Tracer 2000 Computer", downloaded Dec. 19, 2002, http://www.pst911.com/traver.html.

"QuickTime Movie Playback Programming Guide", Apple Computer, Inc., Aug. 11, 2005.

"QuickTime Overview", Apple Computer, Inc., Aug. 11, 2005.

"Rocky Matrix Backlit Keyboard", downloaded Dec. 19, 2002, http://www.amrel.com/asi_matrixkeyboard.html.

"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z....

"TAOS, Inc., Announces Industry's First Ambient Light Sensor to Convert Light Intensity to Digital Signals", www.taosinc.com/pressrelease_090902.htm, downloaded Jan. 23, 2003.

"Toughbook 28: Powerful, Rugged and Wireless", Panasonic: Toughbook Models, downloaded Dec. 19, 2002, http:www.panasonic.com/computer/notebook/html/01a_s8.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.

512MB Waterproof MP3 Player with FM Radio & Built-in Pedometer, Oregon Scientific, downloaded on Jul. 31, 2006 from http://www2.oregonscientific.com/shop/product.asp?cid=4&scid=11&pid=581.

Adam C. Engst, "SoundJam Keeps on Jammin'," Jun. 19, 2000, http://db.tidbits.com/getbits.acgi?tbart=05988.

Alex Veiga, "AT&T Wireless Launching Music Service," Yahoo! Finance, Oct. 5, 2004, pp. 1-2.

Andrew Birrell, "Personal Jukebox (PJB)," Oct. 13, 2000, http://birrell.org/andrew/talks/pjb-overview.ppt.

Apple iPod Technical Specifications, iPod 20GB and 60GB Mac + PC, downloaded from http://www.apple.com/ipod/color/specs.html on Aug. 8, 2005.

Bociurkiw, Michael, "Product Guide: Vanessa Matz,", www.forbes.com/asap/2000/1127/vmartz_print.html, Nov. 27, 2000.

Compaq, "Personal Jukebox," Jan. 24, 2001 http://research.compaq.com/SRC/pjb/.

Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].

Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].

Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.

iAP Sports Lingo 0x09 Protocol V1.00, May 1, 2006.

IEEE 1394—Wikipedia, 1995, http://www.wikipedia.org/wiki/Firewire.

Int'l Application No. PCT/US2005/046797, Written Opinion of the International Searching Authority; Jul. 1, 2005.

International Search Report dated Feb. 4, 2003 in corresponding application No. PCT/US2002/033330.

International Search Report dated Jul. 10, 2007 in corresponding application No. PCT/US2006/048738.

International Search Report dated Apr. 5, 2006 from corresponding International Application No. PCT/US2005/038819.

International Search Report dated Jul. 2, 2007 in related case PCT/US2006/048669.

International Search Report dated Jun. 19, 2007 in related Application PCT/US2006/048753.

International Search Report dated May 21, 2007 from corresponding PCT Application No. PCT/US2006/048670.

International Search Report in corresponding European Application No. 06256215.2 dated Feb. 20, 2007.

Invitation to Pay Additional Fees and Partial Search Report for corresponding PCT Application No. PCT/US2005/046797 dated Jul. 3, 2006.

iTunes 2, Playlist Related Help Screens, iTunes v2.0, Apple Computer, Inc., Oct. 23, 2001.

iTunes, Playlist Related Help Screens, iTunes v1.0, Apple Computer, Inc., Jan. 2001.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff-Arps, et al., "Straβenmusik Portable MP3-Spieler mit USB-Anschluss," CT Magazin Fuer Computer Technik, Verlag Heinz Heise GMBH, Hannover DE, No. 25, Dec. 4, 2000.

PCT/US2005/046797; International Search Report; Nov. 24, 2006.

Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1-4.

Sastry, Ravindra Wadali. "A Need for Speed: A New Speedometer for Runners", submitted to the Department of Electrical Engineering and Computer Science at the Massachusetts Institute of Technology, May, 28, 1999.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.

SoundJam MP Plus, Representative Screens, published by Casady & Greene, Inc., Salinas, CA, 2000.

Specification Sheet, iTunes 2, Apple Computer, Inc., Oct. 31, 2001.

Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate.. Downloaded Aug. 16, 2006.

Steinberg, "Sonicblue Rio Car," Product Review, Dec. 12, 2000, http://electronics.cnet.com/electronics/0-6342420-1304-4098389.html.

Travis Butler, "Archos Jukebox 6000 Challenges Nomad Jukebox," Aug. 13, 2001, http://db.tidbits.com/getbits.acgi?tbart=06521.

Travis Butler, "Portable MP3: The Nomad Jukebox," Jan. 8, 2001, http://db.tidbits.com/getbits.acgi?tbart=06261.

U.S. Appl. No. 11/621,541, "Personalized Podcasting Podmapping" filed Jan. 9, 2007.

U.S. Appl. No. 11/621,544, "Personalized Podcasting/Podmapping", filed Jan. 9, 2007.

Waterproof Music Player with FM Radio and Pedometer User Manual, Oregon Scientific, 2005.

"Creative liefert erstes Portable Media Center aus" [Online] Sep. 2, 2004, Retrieved from the internet on Sep. 20, 2007 from http://www.golem.de/0409/33347.html>.

International Search Report dated Feb. 18, 2008 in Patent Application No. PCT/US2007/079766.

International Search Report Dated Sep. 27, 2007 in Application No. 05824296.7.

Office Action dated Apr. 4, 2008 in U.S. Appl. No. 11/212,555.

Office Action dated Feb. 20, 2008 in Japanese Application No. 2007-538196.

Office Action dated Feb. 25, 2008 in U.S. Appl. No. 11/749,599.

Office Action dated Mar. 4, 2008 from U.S. Appl. No. 10/973,657.

Partial International Search Report dated Feb. 1, 2008 in Patent Application No. PCT/US2007/010630.

Written Opinion dated Feb. 18, 2008 in Patent Application No. PCT/US2007/079766.

Search Report dated Mar. 20, 2008 in Patent Application No. PCT/US2007/077789.

Written Opinion dated Mar. 20, 2008 in Patent Application No. PCT/US2007/077789.

Invitation to Pay Additional Fees and Partial Search Report for PCT Application No. PCT/US2007/077160 dated Apr. 1, 2008.

"Combination Belt Clip Leaf Spring and Housing Latch", Wandt et al.; Motorola Technical Developments, Motorla Inc. Schaumburg, IL. vol. 18, Mar. 1, 1993.

Notification of Reason for Rejection from PCT Application No. 2003-539048 dated Nov. 27, 2007.

Great Britain Office Action dated Apr. 27, 2011, from Great Britain Application No. GB0905051.9.

Australian Office Action dated Feb. 22, 2011 from Australian Application No. 2007296755.

Singapore Written Opinion dated Feb. 10, 2011 from Singapore Application No. 200900149-6.

* cited by examiner

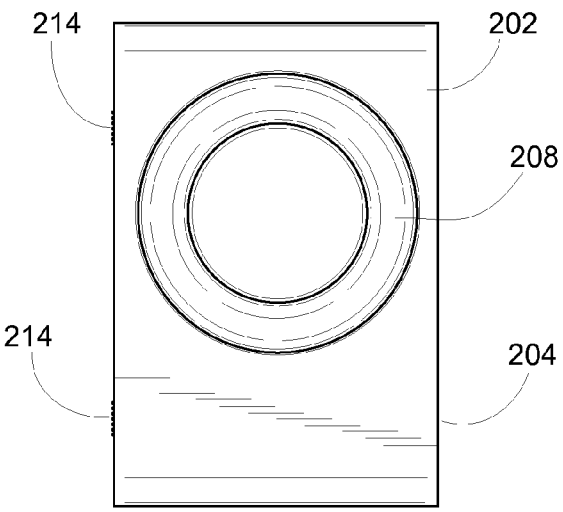
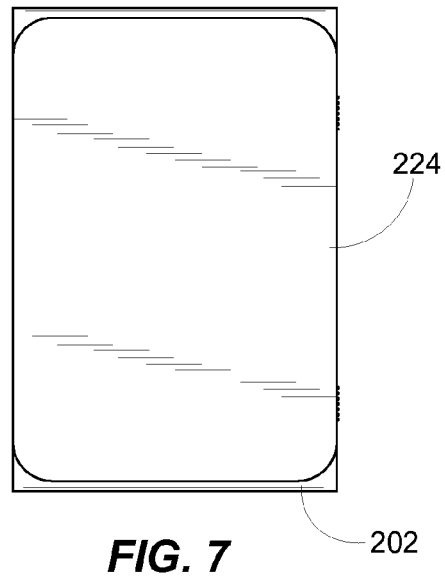
FIG. 6    FIG. 7
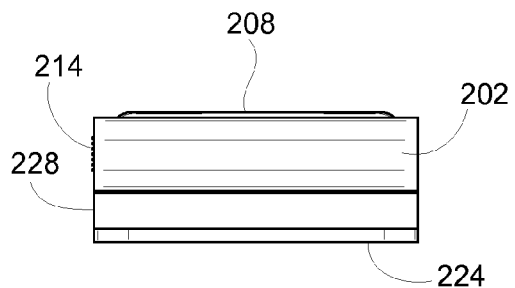
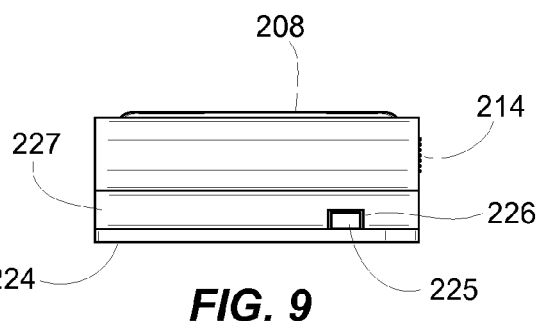
FIG. 8    FIG. 9
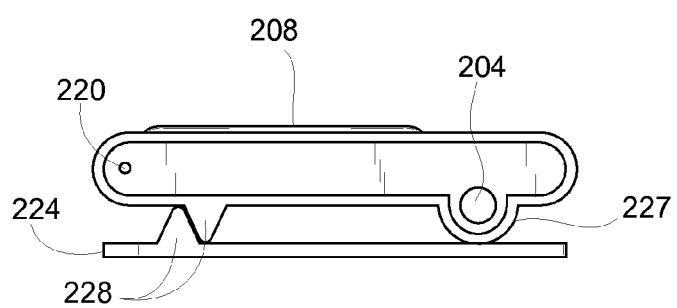
FIG. 10
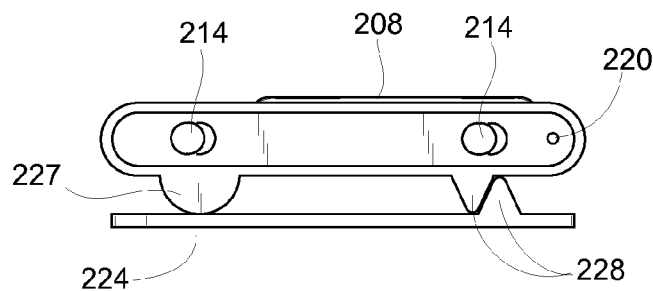
FIG. 11

HIGHLY PORTABLE MEDIA DEVICES

CROSS REFERENCE TO RELATED APPLICATIONS

This application takes priority under 35 U.S.C. 119(e) of U.S. Provisional Patent Application No. 60/844,128, filed Sep. 11, 2006 and entitled, "HIGHLY PORTABLE MEDIA DEVICES" that is incorporated by reference in its entirety.

BACKGROUND OF THE INVENTION

1. Description of the Related Art

The present invention relates to media devices and, more specifically, to portable media players that store and utilize digital media assets.

2. Field of the Invention

Today, USB drives, also referred to as Flash drives or keychain drives, are popular portable data storage devices. A USB drive can be used in place of other storage mediums such as floppy disks, CDs, DVDs, zip drive disks, etc. In most cases, the USB drive is a plug and play device that includes Flash memory for storing data and a USB connector for connecting to a host device. While these devices work well, they are limited in the operations that they can perform. These devices are only configured for storing and transporting stored data (similar to other portable storage mediums) and therefore they do not include processing components, batteries for powering the processing components, or a user interface that enable users to communicate with the processing components.

Portable media players, also referred to as MP3 players, are also popular today. Portable media players can be grouped into three different categories: those with removable media storage, such as CD or DVD players; those with internal hard drives; and those that store media in non-volatile memory. Each category of portable media player has advantages and drawbacks in terms of size, functionality, battery life, and media storage capabilities.

Those portable media players that store media in non-volatile memory are commonly referred to as Flash MP3 players or Flash media players. Flash media players are often smaller than other types of portable media players. One problem common to many conventional Flash media players is that their small size often results in difficult-to-use media player controls. Although conventional Flash media players typically incorporate a display so that a user can navigate through the media files that are stored on the device, the display adds to the size, weight and power consumption. Even with a display, the media player controls are often not user friendly.

Another common problem with conventional Flash media players is bulky batteries, which are typically required to provide a reasonably long battery life before having to recharge the player or replace the player's batteries. Conventionally, media player designs have been made larger in order to accommodate improved user controls, batteries, and/or a display.

As portable media players have become more popular, there has been an increased demand for improved media player design. Thus, there remains a need for media players having improved user controls, small sizes, and longer battery life.

SUMMARY OF THE DESCRIBED EMBODIMENTS

The invention relates, in one embodiment, to a portable media player. The portable media player includes a housing with a front surface and a back surface. The portable media player also includes a memory disposed within the housing. The memory is configured to store a plurality of digital media assets and data files. The portable media player additionally includes a media control input arrangement located at the front surface of the housing. The media control input arrangement enables a user of the portable media player to select at least one of the digital media assets to be presented. The portable media player further includes an integrated attachment mechanism located at the back surface of the housing. The portable media player is wearable through the use of the attachment mechanism.

The invention relates, in another embodiment, to a portable media player that does not have a display. The portable media player includes a housing with a front surface and a back surface. The back surface includes no I/O components. The portable media player also includes a non volatile memory disposed within the housing. The non volatile memory is configured to store a plurality of digital media assets and data files. The portable media player further includes a single media control input arrangement located at the front surface of the housing. The media control input arrangement enables a user of the portable media player to control various aspects of the portable media player. The portable media player additionally includes a controller operatively coupled to the memory and the media player input arrangement. The controller operates to play the selected at least one media asset.

The invention relates, in another embodiment, to a portable media player. The portable media player includes a housing. The portable media player also includes a single integrated connector port extending into the housing. The single integrated connector port is the only portal for distributing data, power and media to and from the portable media player. The portable media player further includes a memory module disposed within the housing and configured to store data files and a plurality of digital media assets. The data files and a plurality of digital media assets being transferred through the single integrated connector port. The portable media player additionally includes a media module disposed within the housing and configured to provide media operations on the portable media player. The media module cooperates with the non volatile electronic memory device to retrieve media assets therefrom. The media module presents the media assets to a user of the portable electronic device through the single integrated connector port. Moreover, the portable media player includes a power module disposed within the housing and configured to control power operations of the portable media player for the purpose of powering or charging the portable media player. The power module receives power through the single integrated connector port.

The invention relates, in another embodiment, to a docking system. The docking system includes a portable media player. The portable media player includes a housing having a front surface, side surfaces, and a back surface; a single media control input arrangement located at the front surface of the housing; a single integrated connector port located at a side surface of the housing and an integrated clip mounted at the back surface of the housing; and the clip including a platform that is spaced apart from the back surface thereby creating a void therebetween. The docking system also includes a docking station. The docking station includes a base with a slot partially recessed within the top surface of the base. The recess is configured to receive an end of the portable media player that includes the single integrated connector port. The inner peripheral surface of the recess is sized and dimensioned to receive the outer peripheral surface of the portable media player including the front surface of the housing and the outer surface of the platform. The docking station also includes a single integrated connector plug that engages the single integrated connector port when the portable media player is placed in the recess of the docking station. The interface between the connector port and the connector plug is configured for distributing data, power and media.

The invention relates, in another embodiment, to a portable electronic device capable of operating as a removable storage medium when connected to a host computing device, and capable of operating as a media player when disconnected from the host computing device. The portable electronic device includes a housing with a front surface, first side surface, second side surface and a back surface. The portable electronic device also includes a non volatile memory disposed within the housing. The memory is configured to store a plurality of digital audio assets and data files. The portable electronic device further includes a rechargeable battery disposed within the housing and configured to provide power to the portable media player as necessary at least when disconnected from a power source. The portable electronic device additionally includes a single integrated media control input arrangement located at the front surface of the housing. The media control arrangement is embodied as a clickable button actuator including a plurality of integrated outer buttons provided in a circular arrangement around a center button. The center button initiating play/pause. The outer buttons including buttons for initiating skip to previous media asset, skip to next media asset, volume up and volume down.

Moreover, the portable electronic device includes a switch arrangement located at the first side surface. The switch arrangement is configured to at least select a media play mode. The play mode is one of a continuous play mode and a shuffle play mode. The portable electronic device also includes a single integrated connector located at the second side surface. The single integrated connector includes capabilities for transferring digital media assets and data files between the portable media player and a host, transmitting power to the portable media player from a power source, and outputting digital audio assets for listening enjoyment. The portable electronic device further includes one or more indicators located on the side surfaces of the housing. The indicators provide user feedback or status information for the portable media player. The portable media player not including a display. The portable electronic device additionally includes a controller operatively coupled to the memory, media player input arrangement, switch arrangement, connector and indicators, the controller operating to play the selected at least one media asset. The portable electronic device also includes a clip integrated with the housing and located at the back surface of the housing, the portable media player being wearable through the use of the clip. The clip includes a platform having substantially the same profile as the back surface of the housing. The clip includes a platform attached to the back surface and moving between an open position where an article of clothing can be positioned for entrapment, and closed position where the article of clothing is trapped between the platform and the back surface of the housing thereby securing the portable media player to the article of clothing.

BRIEF DESCRIPTION OF THE DRAWINGS

The invention will be readily understood by the following detailed description in conjunction with the accompanying drawings, wherein like reference numerals designate like structural elements, and in which:

FIG. 6 is a front diagram of a portable media device shown in FIGS. 4 and 5.

FIG. 7 is a rear diagram of a portable media device shown in FIGS. 4 and 5.

FIG. 8 is a first side diagram of a portable media device shown in FIGS. 4 and 5.

FIG. 9 is a second side diagram of a portable media device shown in FIGS. 4 and 5.

FIG. 10 is a third side diagram of a portable media device shown in FIGS. 4 and 5.

FIG. 11 is a fourth side diagram of a portable media device shown in FIGS. 4 and 5.

DETAILED DESCRIPTION OF THE INVENTION

Figure 1:
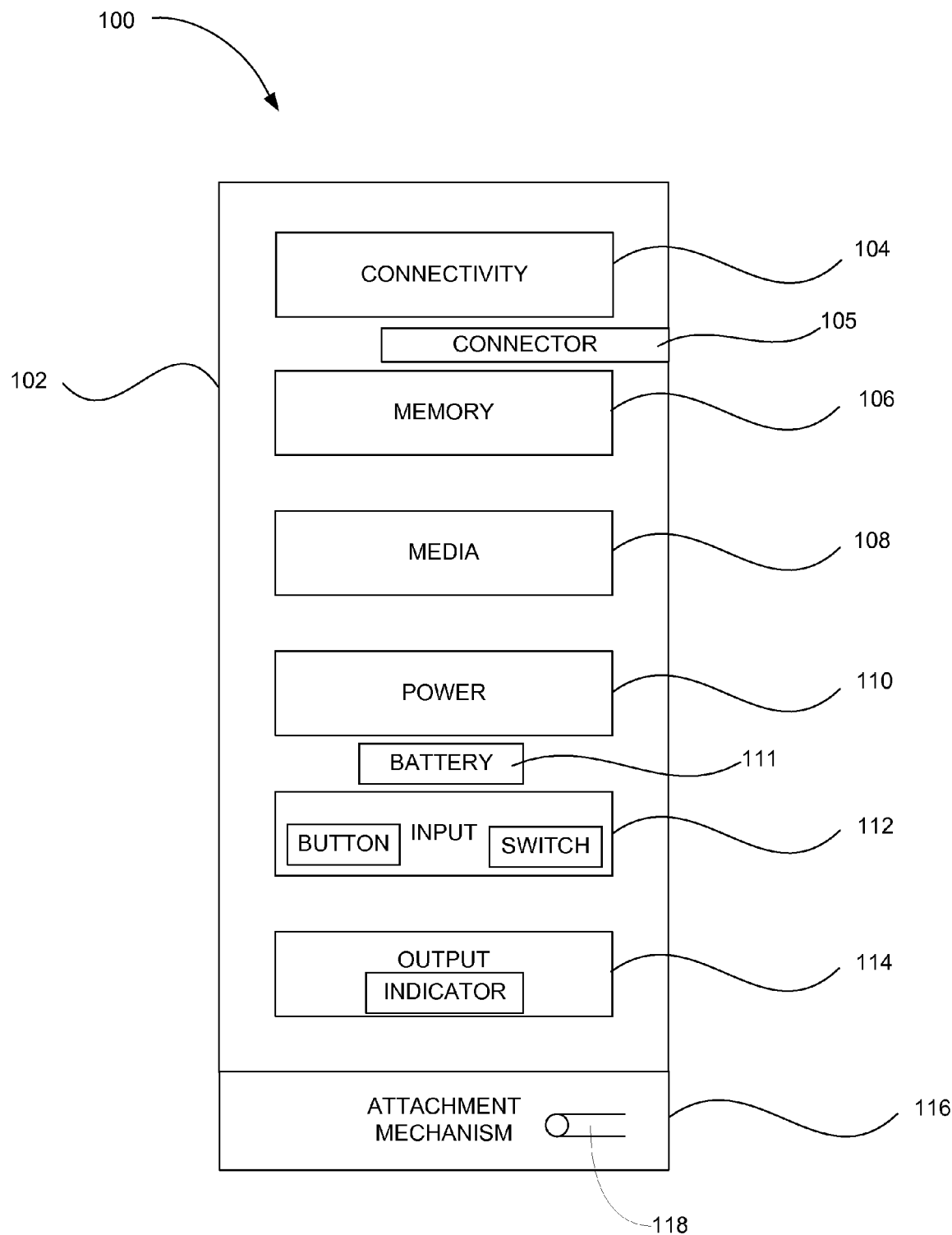
FIG. 1 is a diagram of a portable media device according to one embodiment of the invention.

In general, the invention relates to a media device and methods for operating a media device. The invention is particularly suitable for use with portable media players.

One aspect of the invention pertains to compact portable media devices that include non volatile memory such as flash. The media device may for example have a base volume less than or equal to 15,000 mm3, base dimensions less than or equal to 50 mm×30 mm×10 mm, and a base weight less than or equal to 20 grams. More particularly, the media device may have a base volume less than or equal to about 8230 mm3, base dimensions less than or equal to 41.2 mm×27.3 mm×6 mm, and a base weight less than or equal to 16 grams. The overall sized may vary according to add-ons or additional features such as attachment mechanisms. Because of their decreased size and weight, the portable media devices are extremely portable and easily transportable. Thus, they may be carried by people when performing physical activities such as walking, running, cycling, stair climbing, etc. In some cases, the devices are held in the user's hand, while in other cases the devices are carried or worn by the user thus freeing their hands. They may even be attachable to an article of clothing or similar article such as a backpack without requiring an extremely strong holding mechanism.

Another aspect of the invention pertains to portable media device that include limited I/O devices while still providing all the necessary inputs and some feedback. In one embodiment, the media device does not include a display. As should be appreciated, displays typically require a large area of the media device for operation thereof and therefore the size of the media device can be minimized by the elimination of the display.

In another embodiment, the portable media player includes a single integrated navigation control. The integrated navigation control may for example include typical media controls such as volume +/−, next (fast forward), previous (rewind), play/pause. In one implementation, the single navigation control is embodied as a circular input device. In another implementation, the integrated navigation control is disposed on the front surface of the portable media device. In fact, the integrated navigation control may substantially fill the entire front surface. This maximizes the ratio of control size to size of media device, which is beneficial for keeping the device small but still allowing ease of use. By way of example, the ratio of front housing surface area to navigation control area may be less than or equal to about 3:1, more particularly less than or equal to about 2:1, and even more particularly about 1:1. Furthermore, in some embodiments, the ratio may be between about 3:1 to about 1:1, and more particularly between about 2.85:1 to about 2.3:1.

Furthermore, the media device may include two or fewer switches. The switches may for example include on/off, hold, and modal switches. In this particular implementation, the switches may be disposed on the side surface of the portable media device so that both the navigation controls and switches are accessible with a single thumb when held in a single hand (no U.I is located on the back surface).

In addition, the portable media device may include a single integrated connector thereby reducing the space necessary for connectivity to other devices. The single integrated connector may for example include functionalities for uploading/downloading data, transmitting power, and outputting media such as audio. In one embodiment, the single integrated connector is further embodied as an internal axial jack thereby minimizing its impact at the surface of the media device.

As should be appreciated, most connectors for interfacing with media devices are laterally spaced side by side thereby requiring an elongated extended connector area, which is difficult to minimize and place on small compact portable media devices. In contrast, the jack of the present invention includes a point based opening that extends into the media device, rather than being spread about the surface of the media device. The opening includes axially spaced contacts along its axis that come into contact with corresponding contacts when a plug is inserted into the opening along the axis. Furthermore, the connection doesn't require a specific position. It is 360 degrees symmetric, thereby allowing the plug to be inserted at any position. The user therefore does not have to think when coupling the plug to the jack. In one implementation therefore the media device does not include an elongated ports that have lateral side by side contacts such as for example conventional USB and Firewire ports.

Another aspect of the invention pertains to portable media devices that include an attachment mechanism for securing the portable media device to an article of clothing or similar article such as a back pack. In one embodiment, the attachment mechanism is a clip that is integrated with the housing of the portable media device and that moves between a closed position, trapping the article of clothing between the clip and the housing of the media device, and an open position, where the article of clothing is free from entrapment. When the clip is in the closed position, the portable media device can be worn by the user. For example, the clip may be used to secure the media device to a pants, shirt, belt, pocket, hat, wrist band, shoe, and the like. In most cases, the clip is spring loaded in order to bias the clip in the closed position thereby helping secure the media device to the article. In addition, the chip is typically attached to the back surface of the media device thereby freeing the accessible surfaces of the media device for input controls.

Embodiments of the invention are discussed below with reference to FIGS. 1-21. However, those skilled in the art will readily appreciate that the detailed description given herein with respect to these figures is for explanatory purposes as the invention extends beyond these limited embodiments.

FIG. 1 is a diagram of a portable media device 100 according to one embodiment of the invention. The media device 100 is a portable device including hardware for providing media and data capabilities. The portable media device 100 can couple to a host device such as a computer in order to transfer data between the media device 100 and the host device. This may be done directly (connector to connector) or indirectly (through cables or a docking station). In one embodiment, the media device 100 is plug and play device. The term plug and play (PnP) generally refers to functionality that gives users the ability to connect a device to a host device and have the host device recognize the device with little or no user input.

As shown in FIG. 1, the media device 100 includes a housing 102 that encloses internally the components of the media device 100. The shape and size of the housing 102 may be widely varied. In one embodiment, the housing 102 includes a substantially rectangular front and back surface, and substantially rectangular side surfaces when viewed diagrammatically. In some cases, the side surfaces may be partially or entirely rounded. For example, the cross section taken along one axis that extends across the front and back surfaces may be pill shaped, i.e., rectangle with rounded sides. Furthermore, the housing may include various raised sections. In another embodiment, the housing 102 is cylindrical such that the front and back surfaces are circular.

The media device 100 also includes a connectivity module 104 configured to control interactions with one or more devices or systems that can be coupled to the media device 10. The connectivity module 104 may for example control the reception and transmission of power, data and media between the appropriate components of the media device 100 and various external devices or systems that desire to communicate with the appropriate components of the media device. The external devices may be connected to the connectivity module 104 through wired or wireless connections.

In one embodiment, the connectivity module 104 is connected to a connector arrangement 105 that allows interaction through a physical wired connection (through the housing 102). The connector arrangement 105 may include one or more connectors for the purpose of distributing power, data and media. By way of example, the connectors may include media jacks, data ports, power terminals and the like. Media may for example correspond to audio, images, video, etc. Data may correspond to serial, parallel, USB, Firewire, etc.

In one particular embodiment, the media device 100 only includes a single integrated connector in order to save space thereby allowing the media device 100 to be smaller. The single integrated connector integrates the functionality of multiple connectors into a single connector. For example, the single integrated connector may include power, data and media functionality, thereby allowing power delivery, data communications and media transmissions (e.g., audio, video) to occur at a single location.

The single connector may be widely varied. In one implementation, the connector is an internal jack that extends into the housing and that receives an axial plug along a connection axis. The jack includes axially spaced terminals or contacts for enabling each of its functions (e.g., power, data, media). The terminals come into contact with corresponding contacts when an axial plug is inserted into the jack. As such, the jack is capable of receiving a headphone or speaker plug associated with headphones/speakers so that audio media can be supplied to headphones/speakers and/or a video plug associated with displays so that video media can be supplied to displays. The jack is also capable of receiving a data plug configured for transmitting and receiving data to and from a host device. By way of example, the jack may be used to upload or download audio, video and other media to and from the media device 100. The jack is also capable of receiving a power plug configured for delivering powering to the media player 100. The jack may also be configured to receive an integrated plug that includes multiple functionality similar to the integrated jack as for example data/power, power/media, data/media or media/data/power.

The media device 100 also includes a memory module 106 for storing data. The data can be transferred back and forth between the media device 100 and the host device when the media device 100 is attached to the host device. The data may include media files (e.g., audio tracks), data files, and/or the like. The memory module 106 may be widely varied. In one particular embodiment, the memory module 106 is non-volatile memory, such as solid-state memory (e.g., Flash memory). Solid-state memory has many advantages over other types of memory devices. One advantage of the solid-state memory is that it tends to be very robust because there are no moving parts to break or skip (e.g., embodiment as an integrated circuit chip). Another advantage of solid-state memory is that the memory device tends to be small and lightweight and therefore lends itself to the portability of the media device 100. Any number of non-volatile memory chips may be used to achieve the desired memory capacity. In one example, the memory capacity is configured to be about 1 GB. In another example, memory capacity is configured to be about 2 GB. In another example, memory capacity is configured to be about 512 MB.

The media device 100 also includes a media module 108 for controlling media operations on the media device 100. The media can, for example, be audio, video, images and/or the like. The media module 108 may, for example, be used to present (e.g., play) media on the media device 100. Hence, the media device 100 can be considered a media player. The media module 108 cooperates with the memory module 106 to store and retrieve media data. For example, the media module 108 may access the memory module 106 to obtain or deliver media data such as audio tracks (e.g., songs). The media module also cooperates with the connectivity module when media is to be presented out of the connector arrangement 105.

The media device 100 also includes a power module 110 for controlling power operations of the media device 100. The power module 110 may for example communicate with an on-board battery 111 that provides power to the media device 100. The on-board battery 111 can, for example, power the media device 100 so that the media device 100 can be fully portable and operate when disconnected from any host device. The on-board battery 111 may be a fixed charged battery that needs to be replaced from time to time or the on-board battery may be a rechargeable battery. By way of example, the on-board battery 111 may be an alkaline battery, NiCad battery, Lithium Ion battery, or other type of battery. Rechargeable batteries are typically preferred over fixed charged batteries since they rarely have to be replaced (ease of use). In some cases, the rechargeable battery can be charged through the power functionality of the connector 105 when the connector 105 is operatively coupled to a host device. In other cases, the rechargeable battery can be charged through the power functionality of the connector 105 when the connector 105 is operatively coupled to an external power source such as a standard power plug in conjunction with a transformer/rectifier.

The media device 100 also includes one or more input devices 112 used to make selections or issue commands for the media device 100. By way of example, the input devices 112 may be selected from buttons, switches, keypads, wheels, joysticks, joy pads, touch screens, touch pads, track balls, and/or the like.

In one embodiment, the media device 100 includes one or more sliding switches that slide between various positions in order to change the state or mode of the media device 100. For example, in the case in which the media device 100 provides playing of audio tracks (e.g., music or songs), the sliding switch may include an off position, a shuffle play mode position, and/or a continuous play mode position. When the sliding switch is in the off position, the audio functionality of the media device 100 is turned off. When in the continuous play mode position, the media device 100 plays audio tracks in some predetermined order (e.g., alphabetically by composer or song title). When in the shuffle play mode position, the media device 100 randomly selects a group of audio tracks and then plays the audio tracks in the selected order.

In another embodiment, the media device includes one or more clickable buttons that may be clicked in order to control some aspect of the media device 100. For example, in the case of the media device 100 that includes audio functionality, the clickable buttons may correspond to commands such as previous, next, volume up, volume down and play/pause. In one particular implementation, the clickable buttons may be embodied as a circular input arrangement. For example, an inner button and an outer navigation pad. In another implementation, the clickable buttons may be integrated into a single unit. Alternatively, the clickable buttons may be replaced with touch sensitive devices (e.g., touch pad).

The media device 100 also includes one or more output devices 114. The output devices 114 are configured to transfer data from the media device 100 to the outside world. The output devices 114 can, for example, be used to output audio or visual or tactile information to the user. The output devices 114 may be selected from speakers, audio jacks, video jacks, indicators, haptics mechanism, and/or the like.

Although conventional media devices mandate use of displays (display screens), such as liquid crystal displays (LCDs), for user interaction, the media device 100 advantageously need not include such a display. In one particular implementation, the media device 100 does not include a display, but includes (i) a jack for supplying audio output to a headset or external speakers and (ii) one or more indicators that provide user feedback and/or status of the media device. For example, the indicators may inform the user when a particular input device 112 has been actuated or may inform the user of status of battery life. By eliminating a display, the media device 100 can not only have a small form factor and be highly portable, but also reduce power consumption of the media device and therefore extend the life of the battery 111. As a result, the media device 100 can be used for longer periods of time without recharging or changing the on-board battery 111. In addition, the complexity, cost and damage susceptibility is reduced.

The position of the I/O devices 112 and 114 relative to the housing 102 may be widely varied. For example, the I/O devices 112 and 114 may be placed at any external surface of the housing 102 that is accessible to a user during manipulation of the media device 100 (e.g., top, side, front, or back).

In one embodiment, the input devices 112 are generally positioned at locations that allow for one-handed operation of the input device 112, and more particularly at locations that allow manipulation with a single finger while holding the media device 100 with one hand. In one particular implementation, the input devices 112 are placed at front and/or side surface of the housing 102. The input devices 112 can therefore be actuated by a thumb of a user's hand when the media device 100 is held by the fingers of the user's hand. The output devices 114 are typically placed at locations that allow access thereto when the media device 100 is held in the user's hand. The output devices 114 may, for example, be placed proximate the input devices 112 so that they can be accessed when the user is manipulating the input devices 112. By orienting the I/O devices 112 and 114 in this manner, the media device 100 does not have to be constantly repositioned in order to effectively utilize the I/O devices 112 and 114. For example, undesirable repositioning may be necessary if buttons are placed in a row from the top to bottom of the device.

The media device 100 may integrate all the components described above into a single all-in-one unit, i.e., all the elements are contained within or positioned on the housing 102 of the media device 100. As a result, no support devices are needed (such as attachable battery packs, attachment mechanisms or I/O devices) when operating the media device 100 away from a host device, i.e., the media device 100 is capable of both storing data as well as controlling, playing and outputting media when on the go.

The media device 100 may also include an attachment mechanism 116 integrated with the housing 102 for enabling the media device to be easily carried or worn by a user. As a result, the media device is easy to transport and manipulate when on the go. The attachment mechanism may be widely varied. For example, it may include a strap, neck cord, clip, etc.

In one embodiment, the attachment mechanism 116 includes a clip. The clip 118 typically includes a platform that is hinged to the housing 102 of the media device 100. The hinge may be spring biased thereby creating a pinching action for clipping the media device 100 onto an article of clothing or other similar article. For example, the platform may be moved between an open position where a space is provided between the housing and platform for placement of an article, and a closed position where the clip is biased into engagement with the housing thereby attaching the media device to the article. In some cases, the platform and housing may include engaging teeth to help secure an article disposed therebetween. In one implementation, the platform follows substantially the profile of the housing, i.e., has generally the same shape as the surface it is attached to.

The position of the attachment mechanism 116 and more particularly the clip relative to the housing 102 may be widely varied. For example, the clip may be placed at any external surface of the housing 102. In most cases, it is placed at a location away from the I/O devices 112 and 114 so as to maintain accessibility for the I/O devices. In one implementation, the clip is placed at the back surface of the housing away from the I/O devices located at the front and side surfaces.

Alternatively or additionally, and although not shown, the media device 100 may include imaging components for capturing and viewing images. In cases such as these, the media device 100 may act like a camera. By way of example, the media device may include a CCD or CMOS sensor that communicates with the memory and media modules. Moreover, the media device may include integrated microphone, FM transmitter and the like.

Figure 2:
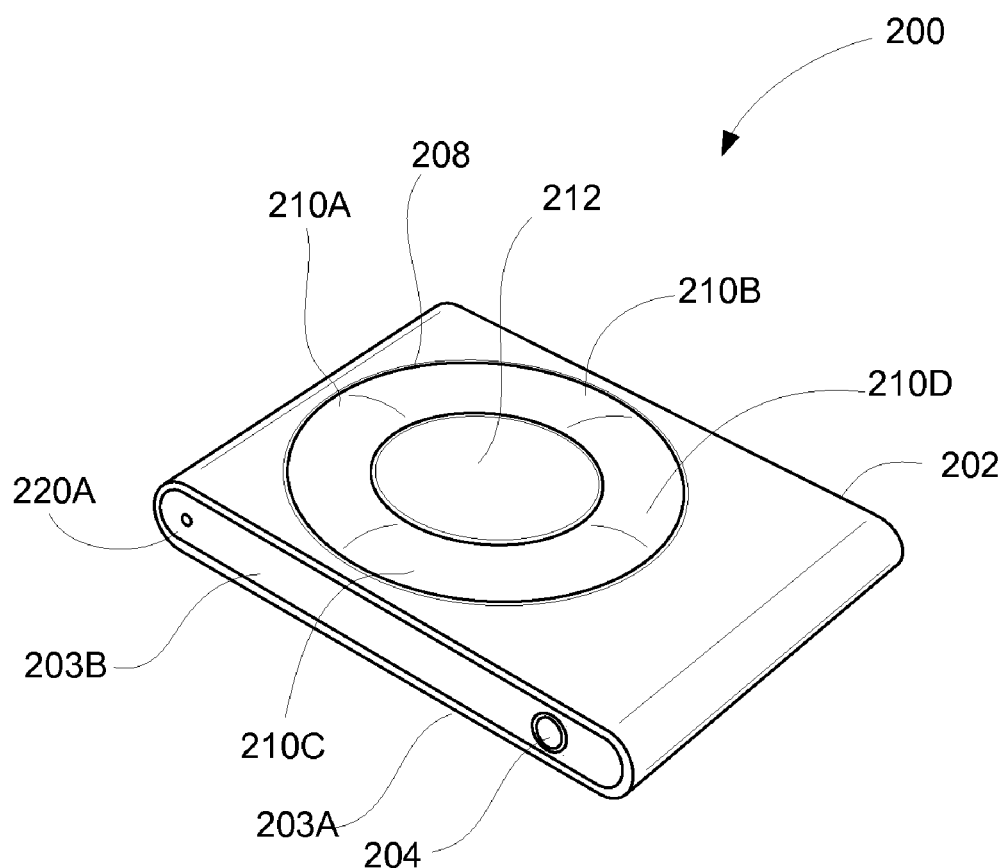
FIG. 2 is a perspective diagram of a portable media device according to one embodiment of the invention.
Figure 3:
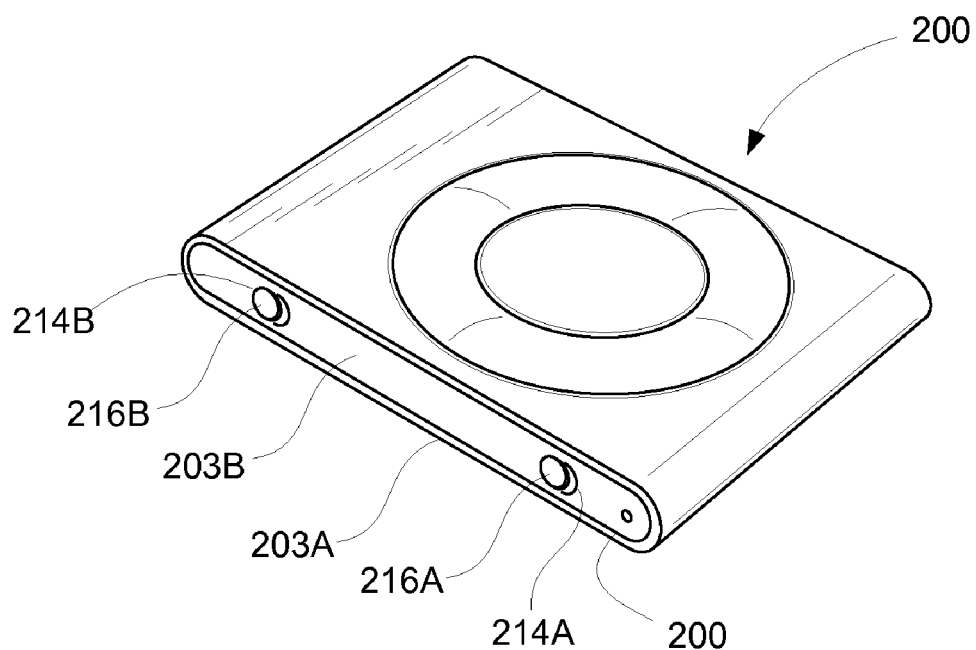
FIG. 3 is a perspective diagram of a portable media device according to one embodiment of the invention.
Figure 4:
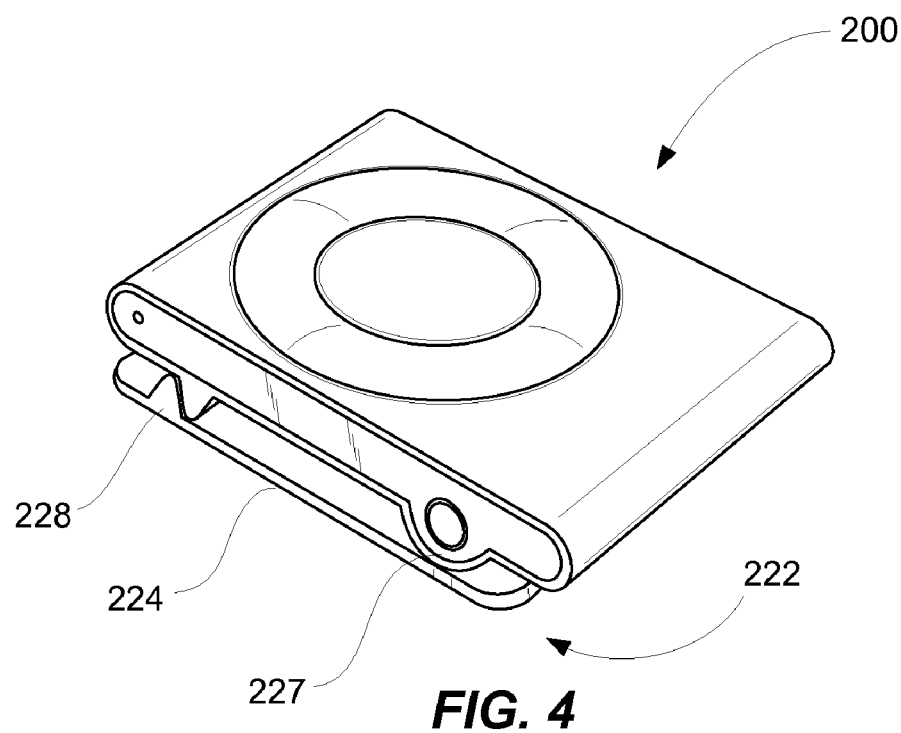
FIG. 4 is a perspective diagram of a portable media device according to one embodiment of the invention.
Figure 5:
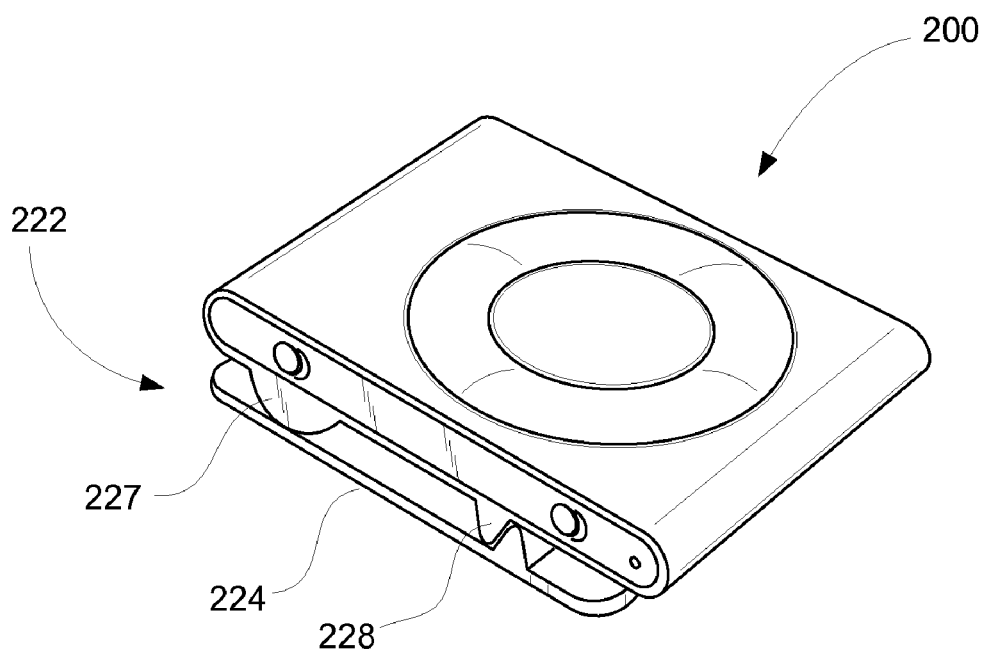
FIG. 5 is a perspective diagram of a portable media device according to one embodiment of the invention.

FIGS. 2 and 3 are perspective diagrams of a portable media device 200 according to one embodiment of the invention. The media device 200 can represent one implementation of the media device 100 illustrated in FIG. 1. The media device 200 is in the form of an integrated compact unit that can be easily held in one hand. The portable media device 200 combines the functionality of a media player with a memory device so that the portable media device 200 is capable of both presenting (e.g., playing) media (e.g., music) and storing various data files when on the go. The memory device can be used to store data files and media data (such as songs and playlists), and the media player can be used to play the media data stored in memory and in accordance with a playlist.

Typically, the media device 200 acts like a storage device (data can be transferred to and from the media device 200) when connected to a host device, and acts as a media player (music player) when removed from the host device (songs can be played). Alternatively or additionally, the media device 200 may act like a media player (music player) when connected to a host device (i.e., can be used to drive playing of music on the host device). It should be emphasized that all the components needed to support these devices when removed from the host device are contained within or positioned on the media device 200. No other support devices are needed to operate the components of the media device 200 (e.g., contains a battery and I/O devices).

As shown in FIGS. 2 and 3, the portable media device 200 includes a housing 202 that defines the shape or form of the device 200. That is, the contour of the housing 202 may embody the outward physical appearance of the media device 200. The housing 202 also encloses and supports internally various electrical components of the media device 200 (including integrated circuit chips and other circuitry). By way of example, the electrical components may include a processor, memory, battery, I/O control circuitry and the like. In some cases, the electrical components are positioned on a substrate or carrier such as a Printed Circuit Board (PCB). The substrate or carrier provides a structure for carrying the electrical components during assembly and supporting them when assembled inside the housing 202.

In one embodiment, the housing 202 includes a tube like main body 203A and end caps 203B that close off the ends of the tube like main body 203A. The main body 203A and ends caps 203B may be formed from the same of different materials depending on the needs of the device. By way of example, the body 203A and end caps 203B may be formed from metals, plastics, ceramics, etc. Furthermore, they may be formed from the same or different process. For example, they may be formed via injection molding, pressing, extrusion, etc. In one particular implementation, the tube like main body 203A is formed out of aluminum via an extrusion process, and the end caps 203B are formed out of plastic via injection molding process.

By way of example, the media device 200 including the housing and internal components may be assembled similarly to the invention disclosed in U.S. patent application Ser. No. 10/884,172, which is herein incorporated by reference.

The media device 200 also includes a connector 204 that extends into a first end cap 203B of the housing 202. The connector 204 is configured for receiving a corresponding connector so that input power, I/O data and/or output media may be transferred between the media device 200 and devices coupled thereto. The connector 204 may be used to upload or download media, or other data to and from the media device 200. For example, the connector 204 may be used to download songs, playlists, audio books, ebooks, and the like into a memory device within the media device 200. The connector 204 may also serve as the interface for powering and charging the media device 200. For example, a rechargeable battery can be charged when the portable media device 900 is connected to a power source or host device via the connector 204. The connector 204 may also serve as the interface for outputting media such as audio to a media outlet (e.g., as speaker or headphones). The connector 204 may, for example, correspond to an axial jack that extends into the housing through the first end cap 203B. The axial jack includes axially oriented and spatially separated contacts or terminals (e.g., power, audio, video, data terminals). The terminals may be dedicated to each functionality, and in some cases the terminals may be shared.

The media device 200 also includes a clickable button actuator 208 located on the front of the housing 202 and a pair of sliding modal switches 214A and 214B located at the second end cap of the housing 202. In such an embodiment, there are no input devices on the back of the media device 200. Advantageously, inputs can be easily made with the thumb while the rest of the hand holds the media device. Each of these input devices 208 and 214 allows a user to interact with the media device 200, i.e., provide user inputs. The clickable button actuator 208 provides playback controls for the media player aspect of the media device 200, while the sliding modal switches 214 A and B provide a means for switching between various modes of the media player. More generally, the clickable button actuator 208 is a control input device.

To elaborate, the clickable button actuator 208 includes a plurality of peripheral buttons 210 that surround a center button 212. In one particular embodiment, the clickable button actuator 208 has a circular arrangement. The peripheral buttons 210 may be separate devices that each provides their own clicking action or they may be integrated into a single device that provides a plurality of clicking actions. If the latter, the single device can be divided into a plurality of independent and spatially distinct button zones. The button zones represent regions of the single device that may be tilted or depressed relative to the housing 202 in order to implement a distinct clicking action.

Although not shown, in one embodiment, the clicking actions are arranged to actuate one or more movement indicators contained inside the housing 202. That is, a particular button or button zone 210, 212 moving from a first position (e.g., upright) to a second position (e.g., depressed) is caused to actuate a movement indicator. The movement indicators are configured to detect movements (e.g., a clicking action) and to send signals corresponding to the movements to a controller of the media device 200. By way of example, the movement indicators may be switches, sensors and/or the like. In most cases, there is a movement indicator for each button or button zone 210, 212.

In the case of a media player, the peripheral buttons 210 may correspond to previous (rewind), next (fast forward), volume up and volume down, and the center button 212 may correspond to play/pause. In some embodiments, one or more of the media device controls are overloaded such that it has more than one function. For example, the pause/play control can function as a hold button, disabling the media device controls to prevent accidental control inputs (e.g., when the media device is in a pocket). In this embodiment, the pause/play control is pressed and held down for a predetermined period of time (e.g., 3 seconds) to initiate the media device control hold. To cancel the hold, the pause/play control is pressed and held in the same manner as used to initiate the media device control hold.

As shown in FIG. 3, each of the sliding modal switches 214 include a sliding member 216 capable of translating between two or more positions in order to adjust the state or mode of the media device 200. In all of these cases, the sliding member 216 is configured to be part of or actuate one or more movement indicators. The movement indicators are configured to detect movements of the sliding member 216 during the sliding action and to send signals corresponding to the movements to a controller of the media device 200. In some cases, detents may be provided at each position in order to inform a user when the sliding member 216 is located at each of the positions. The detents, or other means, may provide force feedback and/or auditory signals, such as clicking sounds, to its user. The detents may also be used to help hold the sliding member in its desired position.

In the illustrated embodiment, the sliding member 216A moves between a first position which turns off the media player, and a second position which turns on the media player. In addition, the sliding member 216B moves between a first position which sets the media player in a shuffle mode, and a second position which sets the media player in a continuous play mode. Generally, in the shuffle play mode, the media device plays through a group of media assets in a random order. In the continuous play mode, on the other hand, the media device plays through the list of media assets according to a default order. Furthermore, the off position allows a user to power off the portable media device while the on position allows a user to power up the portable media device.

The media device 200 does not include a display, but does however include one or more indicators 220 that indicate events associated with the media device 200. By way of example, the events may relate to signals, conditions or status of the media device 200. In one embodiment, the indicators 220, which can include light sources such as light emitting diodes (LED), are typically normally not illuminated but are illuminated for a limited duration when an event occurs. Furthermore, the indicators 220 may turn on and off (e.g., blink) or cycle with increasing or decreasing intensity, and in some cases may even change colors in order to provide more detailed information about the event that is being monitored. In general, the indicators 220 can also be referred to as status indicators or media device status indicators.

The indicators 220 may be conventional indicators that typically include a small clear plastic insert, which is located in front of the LED, and which is inserted within an opening in the housing thus causing it to exist at the surface of the housing. The LED itself may also be placed in the opening in the housing rather than using an insert. Alternatively, the indicator 220 can be configured not to break the surface of the housing. In this configuration, the light source is disposed entirely inside the housing 202. The indicator 220 can be configured to illuminate a portion of the housing 202 thereby causing the housing 202 to change its appearance, i.e., change its color. By way of example, a change in color may indicate a change in status of the media device 200. During operation, an indicator light appears on the surface of the housing 202 when the indicator 220 is on, and it disappears from the surface of the housing 202 when the indicator 220 is off. One advantage of this type of indicator is that there is no trace of the indicator when the indicator is off. In other words, the indicator can be perceived only when the indication (e.g., indicator light) is turned on. Furthermore, the indicator avoids substantial breaks, lines, pits or protrusions in the surface of the housing 202, which are aesthetically unpleasing and degrade the look of the media device 200. Example of indicators of this type are disclosed in greater detail in U.S. patent application Ser. No. 10/773,897, filed Feb. 6, 2004 and entitled "ACTIVE ENCLOSURE FOR COMPUTING DEVICE," which is herein incorporated by reference.

In any of the examples given above, the indicators 220 can be implemented by one or more LEDs. If more than one LED is used, the one or more LEDs can have different colors to indicate different media device states. The one or more LEDs can be placed such that they are located in close proximity to each other so it appears to a user that a single indicator changes color as the media device status changes.

In the illustrated embodiment, the media device 200 includes a condition or control indicator 220A and a status indicator 220B. The control indicator 220A is located on one side of the housing 202 (first end cap). The control indicator 220A is configured to alert or inform a user when a selection has been made via the input device 208. That is, the control indicator 220A provides user feedback so that the user knows that a selection has been successfully made.

The status indicator 220B, on the other hand, is located on the opposite side of the housing 202 (second end cap) opposite the control indicator 220A. The status indicator 220B is configured to alert the user to a particular status, particularly the life of the battery of the media device 200. The status indicator 220B can, for example, be illuminated green when the battery is fully charged, yellow when the battery is low, and red when the battery is dangerously low. The status indicator 220B can also flash on and off (blink) when the battery is critically low. The status indicator 220B may be an always-on indicator that always presents status information, or it may be an on-call indicator that only presents status information when prompted by the user. In the latter case, a button may be provided to activate the status indicator. When the user presses the button, the status indicator presents the status information for some predetermined amount of time (e.g., a few seconds).

In one embodiment, two LEDs of different colors are used as the indicator 220A. In this embodiment, a first color LED is used to give a user visual feedback corresponding to the user operating one or more user controls. A second color is used to give the user visual feedback that the media device is being charged. The first color LED can blink once each time a user operates a first user control (e.g., a volume control) on the user control panel 905. If a second user control (e.g., a play/pause control) on the user control panel 905 is operated, then the first color LED blinks steadily while the selected action continues. According to this embodiment, the second color LED, which emits a different color than the first color LED, blinks steadily while the media device is charging, for example, when the media device is plugged into a connector capable of supplying power to the media device.

In one embodiment, three LEDs of different colors are used to implement the indicator 220B. In this embodiment, each of the three colors of LED is used to give a user visual feedback corresponding to a different battery condition. In order to conserve battery life, in some embodiments, the media indicator 220B is activated by a user control (not shown), such that the indicator 220B operates for a short period of time (e.g., 5 seconds) after the user operates the user control.

For example, in one implementation, the first color LED lights up to indicate that a battery that powers the media device is mostly charged. Over time, as the media device is operated, the battery discharges to a first predetermined voltage indicative of a partially charged battery. Accordingly, the first color LED switches off and second color LED lights up to indicate to the user that the battery has partially discharged. As the battery continues to discharge to a second predetermined voltage, the second color LEDs switches off and a third color LED lights up to indicate to the user that the battery is mostly discharged. Finally, when the battery is almost completely discharged, a single LED (of any color) blinks steadily to indicate to the user that the media device is preparing to shut down because the battery level is insufficient to continue operating the media device. Thereafter, the media device status indicator ceases to give any indication (i.e., none of the LEDs light up) indicating to the user that the battery is substantially completely discharged and must be recharged before the media device can be used again.

The size and weight of the media device can be widely varied. Generally, the media device is sized and weighted for being handheld and easily manipulated with a single hand. In fact, in most cases, it is sized such that it can be held and manipulated with only two fingers (such as index+thumb). In one embodiment, the length of the media device is less than 50 mm, the width of the media device is less than 30 mm, and the thickness of the media device is less than 10 mm. The volume of the media device is therefore less than 15,000 mm3. In one implementation, the length of the media device is less than or equal to about 41.20 mm, the width of the media device is less than or equal to about 27.3 mm, and the thickness of the media device is less than or equal to about 6 mm. The volume of the media device is therefore less than or equal to about 7735 mm3. In another implementation, the length of the media device is less than or equal to about 27.3 mm, the width of the media device is less than or equal to about 27.3 mm, and the thickness of the media device is less than or equal to about 6 mm. The volume of the media device is therefore less than or equal to about 4500 mm3.

Moreover, the outer diameter of the circular input arrangement is less than 30 mm, more particularly between about 20 mm to about 27.3 mm, and even more particularly about 23 mm. In addition, the weight of the media device is less than 20 grams, and more particularly less than or equal to 16 grams.

Although several examples have been given, it should be appreciated that this is not a limitation and the media device can be modified to other sizes and weights. In one example, the media device can scaled up or down according to the dimensions given. Furthermore, additional features such as integrated attachment mechanisms may increase the overall size and weight of the media device.

In accordance with one embodiment of the present invention, the media device 200 may also include an integrated clip for attaching the media device to an article such as an article of clothing. The clip typically includes a moving member that moves between a closed position where an article is trapped between the moving member and the housing thus securing the media device to the article, and an open position where the article is released from engagement between the moving member and housing thus freeing the media device from the article (e.g., open position allows placement of the article between the housing and moving member). The platform may for example translate, pivot, rotate relative to the housing between the closed and open position. In most cases, the moving member is further biased in the closed position to help secure the media device to the article. Thus, a user must overcome the biasing force to place the moving member in the open position. By way of example, any suitable spring element may be used to provide the biasing force. Alternatively or additionally, holding detents or snaps may be used to help secure the moving member in its desired position. The holding detent may for example create a locking action that allows the moving member and housing to grab the article with extreme force.

To elaborate, FIGS. 4-11 show the media device of FIGS. 2 and 3 with an integrated clip 222, in accordance with one embodiment of the present invention. The integrated clip 222 is attached to the back side of the housing 202 away from the user input areas of the media device. As shown, the integrated clip 222 includes a platform 224 that pivots relative to the housing 202 between a closed position, placing the platform 224 close to the housing 202 and an open position, placing the platform 224 away from the housing 202. This may for example be accomplished with a hinge mechanism.

Any suitable hinge mechanism can be used. In the illustrated embodiment, an internal hinge mechanism is used. In this arrangement, the platform 224 includes a shoulder 225 that extends from the underside of the platform 224, and the media device 200 includes a corresponding fixed shoulder (not shown) disposed internally within the housing 202. The shoulder 225 of the platform 224 engages the corresponding shoulder of the media device 200 through a small opening 226 in the housing 202. The shoulders when engaged allow pivoting movements therebetween. For example, each shoulder may include an opening with a pivot pin placed therein in order to create a pivoting action. Alternatively, one of the shoulders may include a pivot pin while the opposite shoulder includes an opening for receiving the pivot pin. In most cases, the small opening where the shoulders engage is placed away from the edge of the media device (underneath the platform) in order to protect the media device from contaminants as well as to make the device more aesthetically pleasing to the user.

The platform 224 is preferably biased in the closed position so as to help secure the media device to an article of interest. Any suitable spring means may be used. In one implementation, a torsion spring placed between the shoulders is used. The torsion spring has one end that works against a first shoulder and a second end that works against a second shoulder thus placing the platform in the closed position. In order to move the platform to the open position, the platform must be pivoted about the pivot axis against the force of the torsion spring.

In order to allow space for the article, the platform 224 may be spaced away from the back surface of the housing 202. For example, the housing 202 may include a raised section 227 where the platform 224 is attached. To promote the pivoting action, the raised section 227 may be rounded as shown. Furthermore, in order to help secure the media device 200 to the article, the platform 224 and housing 202 may include teeth 228 that substantially engage one another in the closed position. The teeth 228 help bite down and grasp the article thus securing the media device 200 to the article (pinched therebetween). As shown, the teeth 228 are disposed proximate the end opposite the pivot axis.

The features and feature sizes of the clip can be widely varied. In one embodiment, the radius of the raised section of the housing is less than or equal to about 3 mm, and the thickness of the platform is less than or equal to 1 mm. When taking these into account, the volume of the media device is therefore less than or equal to about 8230 mm3 using for example the dimensions of 41.2×27.3×6 as base dimensions (overall size may be about 41.2×27.3×10).

Figure 12A:
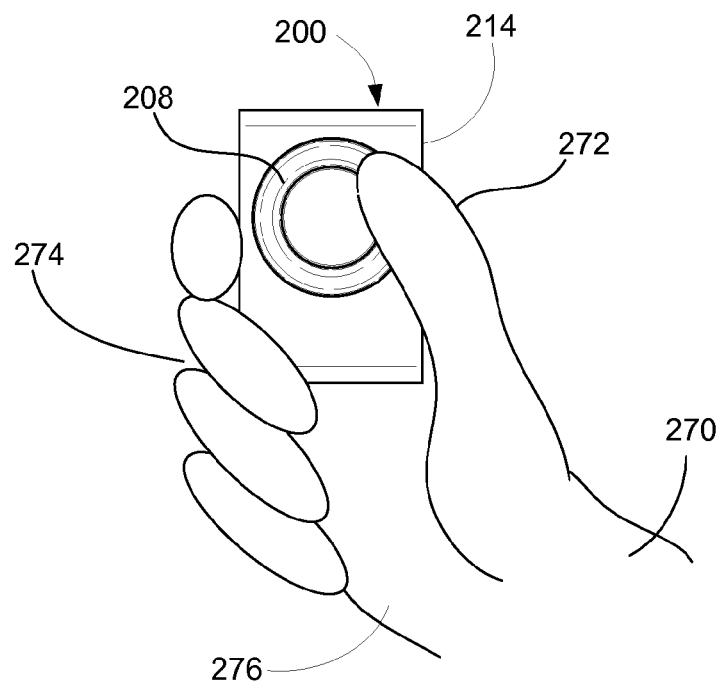
FIGS. 12A and 12B illustrate a media device seated within a user's hand.
Figure 12B:
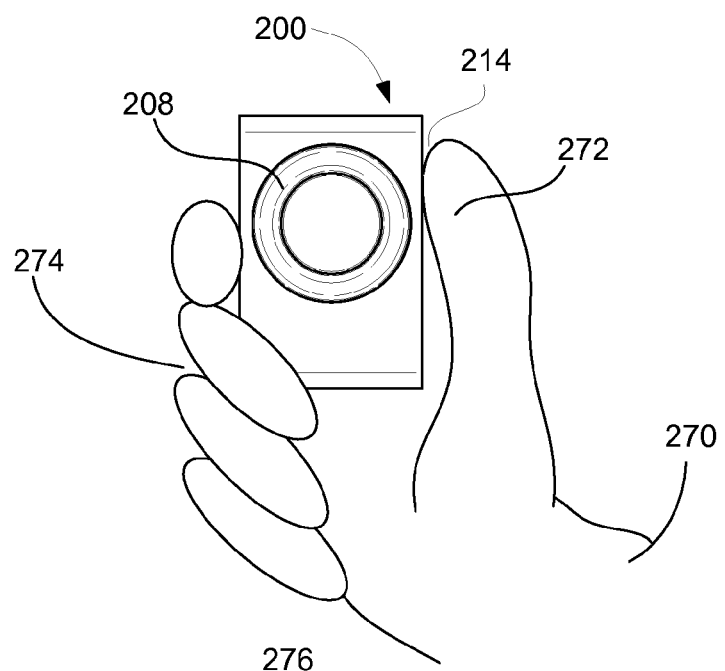

Referring to FIGS. 12A and 12B, the media device 200 is comfortably seated within a user's hand 270 (and removed from any host device). As shown in FIG. 12A, the control input device 208 can be easily manipulated by the thumb 272 of the hand 270 while the fingers 274 and palm 276 of the hand 270 holds the media device 200. By way of example, the user may move their thumb 272 over any of the various buttons of the control input device 208 without repositioning their hand 270, and more particularly their fingers 274. As shown in FIG. 12B, the modal switches 214 can be easily manipulated by the thumb 272 of the hand 270 while the rest of the hand holds the media device 200. By way of example, the user may use their thumb 272 to move one of the sliding modal switches 214 to any of their various positions.

Figure 13:
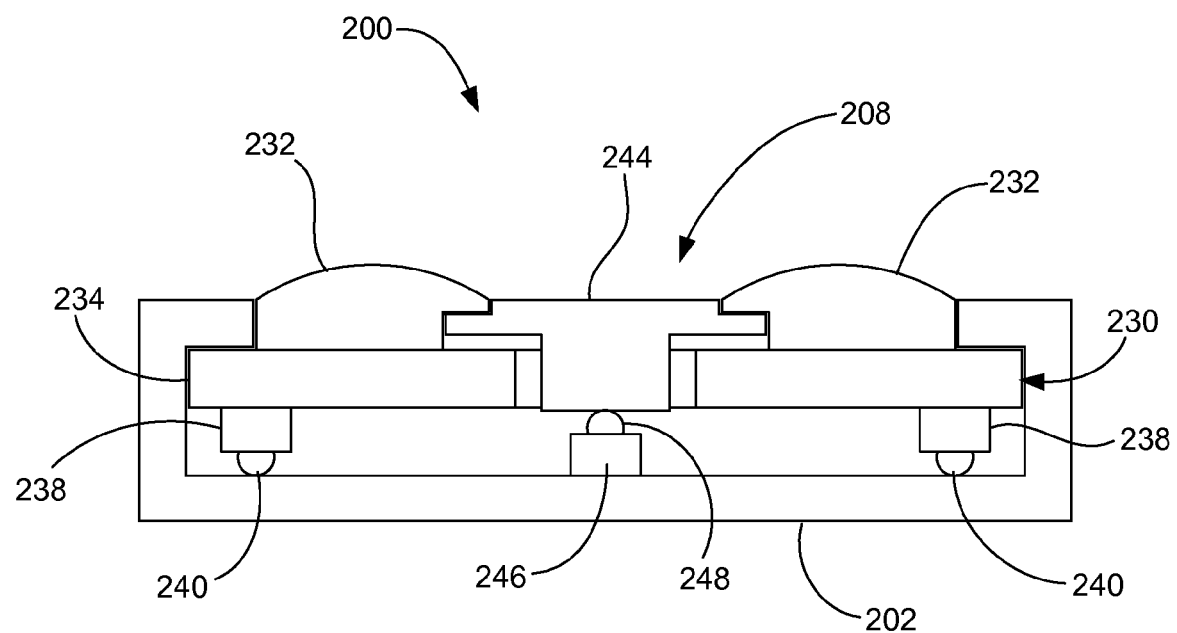
FIG. 13 is a diagram of a control input device according to one embodiment.

Referring to FIG. 13, the control input device 208 according to one embodiment will be described in greater detail. As shown, the control input device 208 includes a movable platform 230 that tilts relative to the housing 202. In some cases, the platform 230 is movably coupled to the housing 202 and in other cases the housing 202 movably restrains a floating platform 230 (as shown). The platform 230 generally includes a cosmetic or tactile layer 232 that is attached to the top surface of a rigid plate 234. The cosmetic layer 232 protrudes though an opening 236 in the housing 202, and provides a tactile surface for actuating the various peripheral buttons of the control input device 208. In the illustrated embodiment, the cosmetic layer 232 includes a rounded top surface.

The control input device 208 further includes one or more mechanical switches 238 disposed between the platform 230 and the housing 202 in order to generate input signals based on movements of the platform 230. The mechanical switches 238 are typically placed in locations that correspond to the various button zones. Each of the button zones includes a distinct mechanical switch 238 located underneath the button zone. The mechanical switches 238 include actuators 240 that cause input signals to be generated when depressed. Tilting the platform 230 in the region of the mechanical switch 238 compresses the actuator 240, thereby causing an input signal to be generated. In most cases, the actuators 240 are spring biased so that they extend away from the mechanical switch 238 and bias the platform 230 in the upright position. The mechanical switches 238 may be attached to the housing 202 or to the platform 230. In the illustrated embodiment, the mechanical switches 238 are attached to the backside of the platform 230. As such, the mechanical switches 238 and more particularly the actuators 240 act as legs for supporting the platform 230 in its upright position within the housing 202 (i.e., the actuators rest on the housing or some component mounted to the housing). By way of example, the mechanical switches 238 may correspond to tact switches, such as dome switches packaged for SMT.

As mentioned above, the platform 230 is movably restrained within a cavity 242 provided in the housing 202. In essence, the platform 230 floats in space relative to the housing 202 while still being constrained thereto (the platform is not attached to the housing). As shown, the platform 230 is surrounded by side walls, a top wall and bottom wall of the housing 202. The side walls are configured to substantially prevent movements in the x and y directions as well as rotations about the z axis (e.g., excluding a small gap that allows a slight amount of play in order to prevent the platform 230 from binding with the housing during the tilting action). The top and bottom walls, however, are configured to allow movement (although limited) in the z direction as well as rotation about the x and y axis in order to provide the tilting action. That is, while the top and bottom walls and may constrain the platform 230 to the cavity 242, they also provide enough room for the platform 230 to tilt in order to depress the actuator 240 of the mechanical switches 238. Furthermore, the spring force provided by the mechanical switches 238 places the top surface of the platform 230 into mating engagement with the bottom surface of the top wall of the housing 202 (e.g., upright position).

During operation, a user simply presses on the top surface of the platform 230 in the location of the desired button zone in order to activate the mechanical switches 238 disposed underneath the platform 230 in the location of the button zones. When activated, the mechanical switches 238 generate input signals that may be used by the media device 200. To activate the mechanical switch 238, a force provided by a finger works against the spring force of the actuator 240 until the mechanical switch 238 is activated. Although the platform 230 essentially floats within the cavity of the housing 202, when the user presses on the desired button zone over one side of the platform 230, the opposite side contacts the top wall (opposite the press) thus causing the platform 230 to pivot about the contact point. In essence, the platform pivots about four different axes.

Furthermore, a button cap 244 is disposed between the cosmetic layer 232 and the top side of the rigid plate 234. A top portion of the button cap 244 is configured to protrude through an opening in the cosmetic layer 232 while a flange portion is retained in a space formed between the cosmetic layer 232 and the rigid plate 234. The top portion of the button cap 244 may be pushed to activate a fifth switch 246 located underneath the button cap 244. The fifth switch 246 may be attached to the housing 202 and pass through openings in the rigid plate 234 and cosmetic layer 232. When assembled, the actuator 248 of the fifth switch 246 forces the button cap 244 into an upright position via a spring element similar to the other switches 238.

It should be noted that the particular implementation described in FIG. 13 is not a limitation and that the control input device 208 can be configured in a variety of different ways. U.S. patent application Ser. No. 10/643,256, filed Aug. 18, 2003 and entitled "MOVABLE TOUCHPAD WITH ADDED FUNCTIONALITY," describes several embodiments of control input devices that may be used, including control input devices with touch sensitive components, and is hereby incorporated herein by reference.

Figure 14:
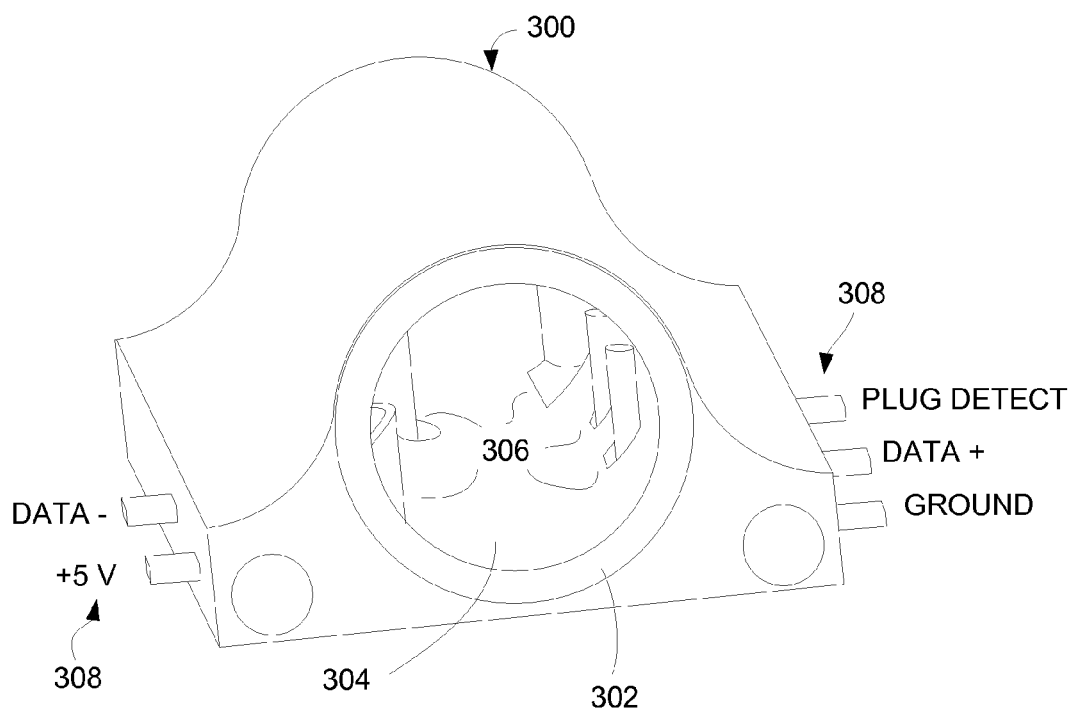
FIG. 14 is a diagram of a single integrated connector according to one embodiment.

Referring to FIG. 14, a single integrated connector assembly 300 according to one embodiment will be described in greater detail. The assembly 300 may for example be mounted within the housing of any of the media devices described herein. The assembly 300 includes a connector body 302 having an axial opening 304 disposed therein. Disposed within the axial opening 304 are various terminals 306 for transmitting power, data and media. As shown, the terminals 306 are incrementally spaced along the axis of the axial opening 304 such that they are electrically separated. When a plug is inserted into the axial opening 304, the plug pushes up against the terminals 306. In some cases, the terminals 306 act as flexures that are biased inwardly towards the axis. As such, they provide some holding power for the plug. Furthermore, they may act as detents when they engage corresponding terminals (e.g., grooves) on the plug. Moreover, the terminals 306 include contact pins, posts or wires 308 that pass through the connector body 302 from the axial opening 304 to the edge of the connector body 302. The contact pins 308 serve as locations where the assembly 300 can be connected to the internal circuitry of a media device.

The terminals 306 may be widely varied. The terminals may for example include data terminals for transferring data between the media device and a host device, power terminals for powering the media device and/or charging an internal battery, audio channel terminals for transmitting audio as for example to speakers or headphones, a plug detect for detecting when a plug is inserted in the axial opening, and the like.

In accordance with one embodiment, the connector assembly is configured to perform more than one function from the same terminal or group of terminals. For example, the same terminal or group of terminals may be used for both transferring data and transmitting media for output (e.g., audio). Sharing terminals reduces the number of terminals needed for the desired functionality and as a result, the axial distance of the connector can be reduced (terminals are spaced apart axially). Having a shorter axial distance creates a more compact connector assembly, which is beneficial for small media devices with limited space (as in the present design). Reducing the number of terminals also reduces the number of contact lines, which can have the result of reducing the size of the controller (e.g., smaller chip can be used since less contacts are needed).

In most cases, the shared terminal(s) communicate with a controller over the same shared line or channel. The lines may be embodied as traces or other well-known routing technologies such as those associated with printed circuit boards, flex circuits and integrated chips. Furthermore, the controller may be embodied as an application specific integrated circuit chip or it may represent a portion of a host controller.

The controller may include a control module for each function. For example, the control module may include a data transfer module for controlling data transfer operations, a media output module for controlling the output of media and a power module for controlling power operations. The controller may further include a control module that is operatively coupled to all the various components. During operation, the control module selectively switches the operation between the different modules. The method of operation may for example include a first block where a first operation is performed at one or more shared terminals. The method of operation may also include a second block where a second operation is performed at one or more shared terminals. The method of operation may additionally include a third block where the first and second operations are selectively switched back and forth so that both operations can occur at the same node over the same communication channel (albeit at different times).

In the illustrated embodiment, the assembly 300 includes two data terminals (D+ and D−), a ground (GND), a voltage (VBUS) (e.g., +5V), as well as a plug detect. In this embodiment, the data terminals (D+, D−) are used for multiple functions including transferring data between a host device and the media device, and acting as the left and right channels for outputting audio. The media device may include a controller for determining what operation is desired, and switching between the operations based on the desired mode of operation (opening one and closing the other).

Although thee position may vary according to the desired needs of each device, in the illustrated embodiment, the left side of the opening includes the VBUS terminal and the D− terminal, and the right side of the opening includes the GND, D+, and plug detect terminals.

In one example, when the media device is in the upload/download media mode, the power (+5V) acts as Vbus to charge the unit, the ground acts as GND to charge the unit, the D+ and D− data lines are used for media transfer (e.g., songs), and the plug detect is not used. Further, when the media device is in a charging mode, the power (+5V) acts as Vbus to charge the unit, and the ground acts as GND to charge the unit.

Further still, when the media device is in an audio output or play mode, the power (+5V) acts as GND, the ground acts as GND, the D+ data line acts as a right channel for audio, and the D− line acts as a left channel for audio.

The plug detect terminal is typically used in the audio output mode. Music is paused when a plug is removed and the media device will subsequently go to sleep after one minute of inactivity.

The controller may include a set of configurable I/O pins for each multifunctional terminal. The number of configurable pins typically corresponds to the number of shared communication lines (e.g., a pin for each line). Because they are configurable, the I/O pins can be rearranged for operations associated with different functions. By way of example, the I/O pins functionality may be switched between ground, a voltage source, various digital inputs, etc. In a data transfer mode, the I/O contacts are configured for transferring data. In a media output mode, the I/O contacts are configured for outputting media.

Figure 15:
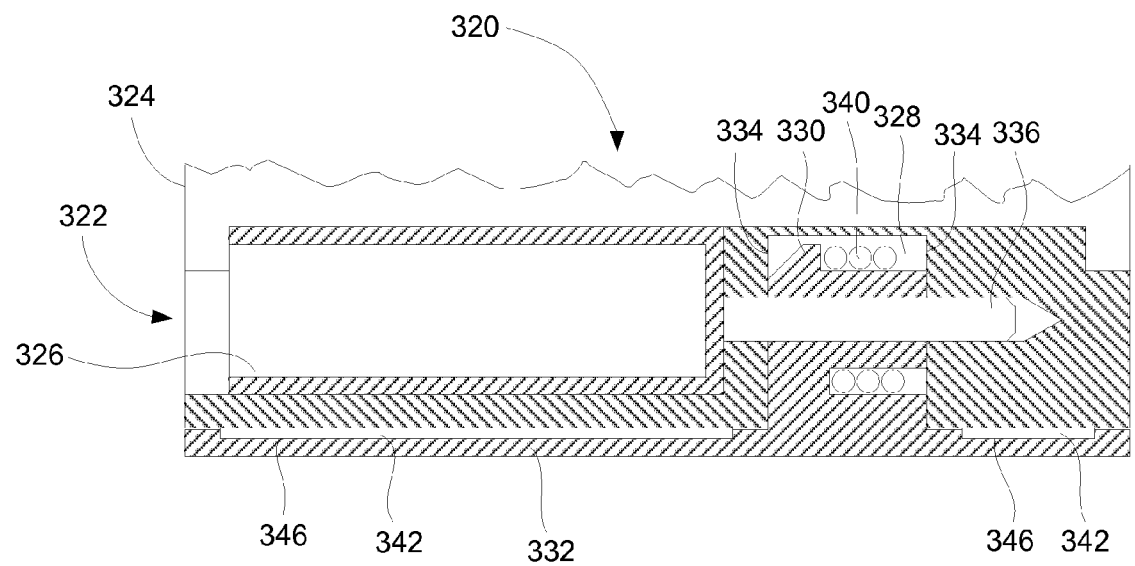
FIG. 15 is a diagram of a hinge mechanism according to one embodiment.

Referring to FIG. 15, a hinge mechanism 320 according to one embodiment will be described in greater detail. The hinge mechanism 320 may for example be utilized in any of the media devices described herein. In this embodiment, the hinge mechanism 320 is situated in a raised section 322 of the media device housing 324 next to a single integrated jack 326 mounted in the media device housing 324. As shown, the housing 324 includes an opening 328 therein for receiving a shoulder 330 that protrudes from the bottom of a pivoting platform 332. The opening 328 includes side walls 334 next to the shoulder 330 that keep the platform 332 from sliding horizontally along the pivot axis (e.g., abutment stops). The walls 334 and shoulder 330 include through holes for receiving a pivot pin 336. The pivot pin 336 may for example be press fit in the through holes of the walls 334, and loosely held by the through hole of the shoulder 330 thereby enabling a pivoting action. That is, the platform 332 rotates about the pivot pin 336.

The hinge mechanism 300 may further include a torsion spring 340 that abuts the housing 324 and the shoulder 330 of the platform 332. The torsion spring 340 produces a biasing force that pushes the platform 332 towards the back side of the housing 324. In order to produce a smooth but tight pivoting action, the hinge mechanism 300 may further include one or more Teflon strips 342 disposed between the bottom surface of the platform 332 and the top surface of the raised section 322 of the housing 324. In some cases, the Teflon strips 342 are free floating therebetween while in other cases they are attached to either the raised section 322 or the platform 332. In order to hide the Teflon strips 342 from view as well as retain the Teflon strips 342 in their desired location, the platform 332 may include recesses 346 for placement of the Teflon strips 342. As such, at the sides it appears as though the platform 332 pivots about the surface of the raised section 322 not the Teflon strips 342.

In accordance with one embodiment of the present invention, a docking station 400 may be used with the media player shown in FIGS. 4-11 in order to provide a platform for quickly and easily coupling a portable media device to another system or device as for example a computer, a power source, or peripheral devices such as a monitor, a keyboard, speakers, etc.

The docking station may be a stand alone unit that communicates with other devices or systems through wired (e.g., cables) or wireless (e.g., Bluetooth) connections, or alternatively, the docking may be integrated directly into the other devices or systems. In either case, the docking station includes an opening or slot that receives the portable media device. The opening is typically configured to support the portable media device in an upright position (e.g., generally vertical) while maintaining access to the U.I. portion of the portable media device.

The dock also includes a way of interfacing the portable media device with the other devices or systems. By way of example, the opening may include one or more connectors that engage one or more ports on the portable media device when the portable media device is placed in the opening. In the case of a stand alone unit, the connector may be coupled to other connectors, ports or transceivers that provide external connections to the other devices or systems. In the case of an integrated docking station, the connector may be wired directly to the components of the host device.

Figure 16A:
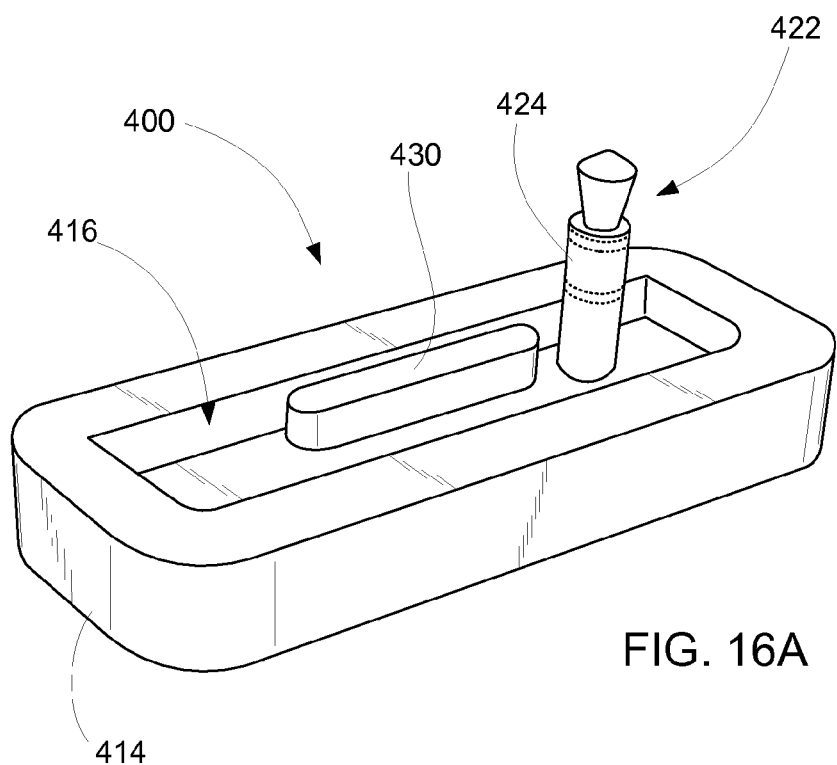
FIG. 16A is a perspective diagram of a docking station according to one embodiment.

To elaborate, FIG. 16A shows one example of a docking station 400 that can be used with the portable media device of FIGS. 4-11, in accordance with one embodiment of the present invention. As shown, the docking station 400 includes a base 414 and an opening or slot 416 that is partially recessed in the top surface of the base 414. The base 414 is configured to enclose internally various electrical and structural components. The base 414 is also configured to define the shape or form of the docking station 400. The shape may for example be substantially rectangular (as shown) or alternatively the shape may be circular, cubical and the like. Furthermore, the base 414 may be formed by one or more housing components. For example, the base 414 may include an upper housing and a lower housing that are attached using any suitable technique including for example screws, bolts, snaps, adhesives, latches, etc.

Although the opening 416 can be configured to receive any side of the portable media device 200, in this particular embodiment the opening 416 is configured to receive an end of the portable media device 200 so as to support the portable media device 200 in an upright position when the portable media device 200 is inserted in the recessed opening 416. As should be appreciated, the walls of the opening serve as guides for placing the media device in the correct engagement position. The shape and size of the opening 416 is generally configured to coincide with the overall shape and size of the end of the portable media device 200. That is, the inner peripheral surfaces of the openings 416 are sized and dimensioned to receive the outer peripheral surfaces of the portable media device 200. As should be appreciated, the walls of the opening serve as guides for placing the media device in the correct engagement position. In the context of the media device shown in FIGS. 4-11, the opening is designed to wrap around the front and top and bottom surfaces of the housing as well as the outer surface of the platform of the clip.

Located within the opening 416 is an interface 422 that operatively couples the portable media devices 200 to the docking station 400. The interface may be widely varied. In the illustrated embodiment, the interface 422 includes a single electrical connector 424 that engages the single electrical port on the bottom side of the portable media devices 200. For example, the docking station 400 may include a male plug that is inserted into the female jack 402 of the media device 200. The male plug is generally dimensioned for a tight fit within the port so as to secure the connection between the portable media device 200 and the docking station 400 (e.g., friction coupling). Furthermore, the plugs and ports typically include pins or contacts that come together to allow electrical transmissions therebetween. The electrical connection may be configured to transfer media, data and/or power between the portable media devices 200 and the docking station 400. In one implementation, a single connector capable of transferring media, data and/or power is used.

In order to further guide and secure the portable media device in place, the docking station 400 may additionally include one or more guide posts 430 that extend out of the bottom of the opening 416 and into the void found between the platform 224_ and the back surface of the housing 202 when the portable media device 200 is inserted into the opening 416 in the docking station 400. The guide post 430 includes reference or alignment surfaces corresponding to the four sides of the void. In the illustrated embodiment, a single guide post is used. The single guide post 430 has substantially the same shape as the void. In some case, the guide post 430 may include rounded sides in order to make placement thereover easier. When the portable media device 200 is inserted inside the opening 416, the walls of the opening 416 and the guide post 430 surround the surfaces of the portable media device 200 thereby helping secure it in place.

Figure 16B:
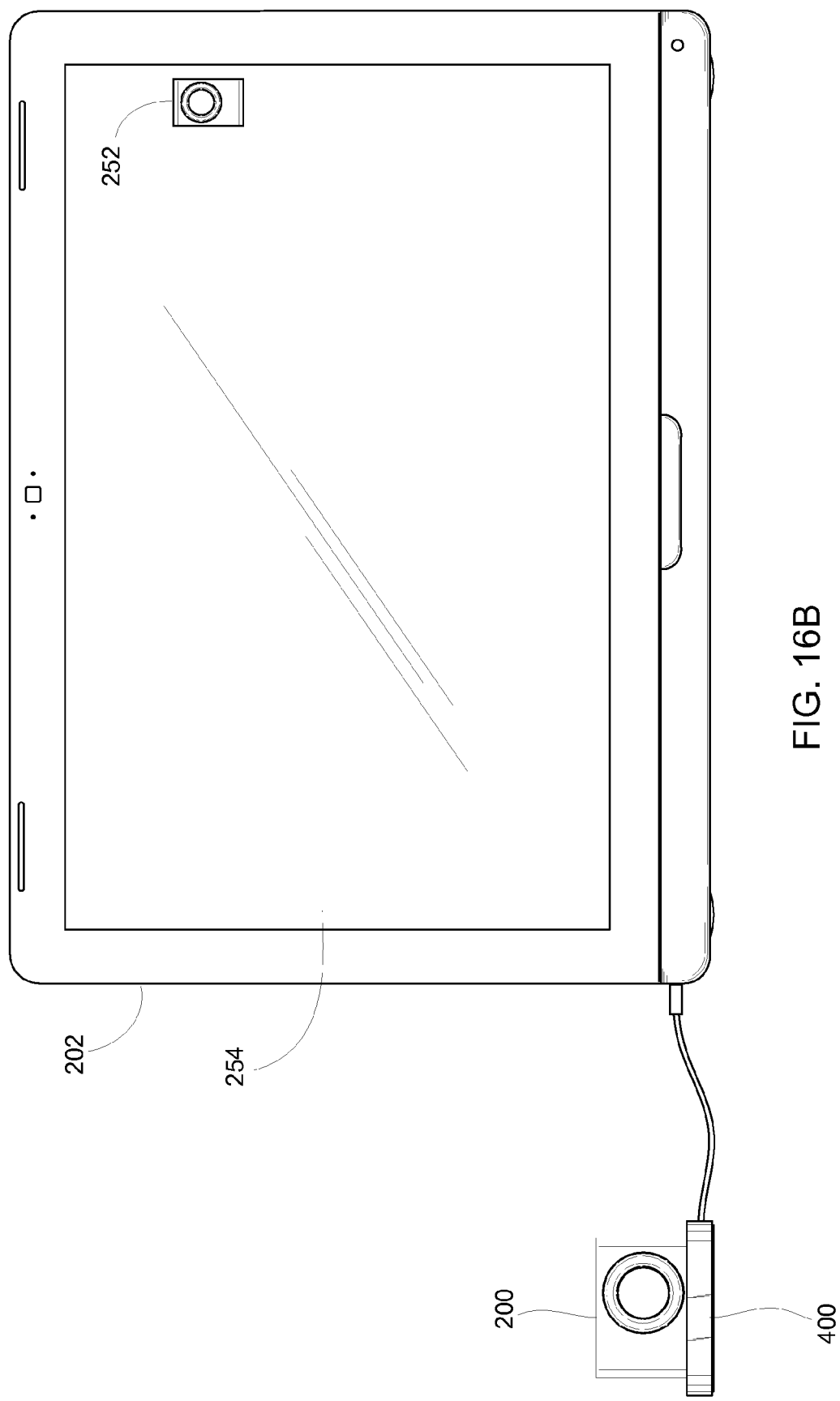
FIG. 16B shows the media device plugged into a docking station, which is connected to a laptop computer according to one embodiment.

FIG. 16B shows the media device 200 plugged into the docking station 400, which is coupled to a laptop computer 250. When connected, the laptop computer 250 can supply power to the media device 200 through the docking station 400 in order to power the media device 200 as well as to possibly charge its battery. Because the media device 200 is typically a plug and play device, the laptop computer 250 recognizes the media device 200 as a media device and in some cases generates a media device icon 252 on the display 254 of the laptop computer 250. Selecting the media device icon 252 typically opens a window that shows the data and media files stored in the memory of the media device 200. The data and media files stored on the media device 200 can be transferred to the laptop computer 250 using a drag and drop function.

In addition, new data and media files stored on the laptop computer 250 may be added to the memory of the media device 200 using a drag and drop function. In some cases, some or a portion of the media files stored in the laptop computer 250 are automatically synchronized with the media device 200. That is, once the laptop computer 250 recognizes the media device 200 and determines that the media device 200 includes media functionality, the laptop computer 250 can be configured to automatically deliver all or a select few of the media files (e.g., audio tracks) stored in the laptop computer 250 to the memory of the media device 200. The laptop computer 250 can also launch a media management application when the media device 200 is recognized. One example of a music management program is iTunes® manufactured by Apple Inc. of Cupertino, Calif.

Figure 17A:
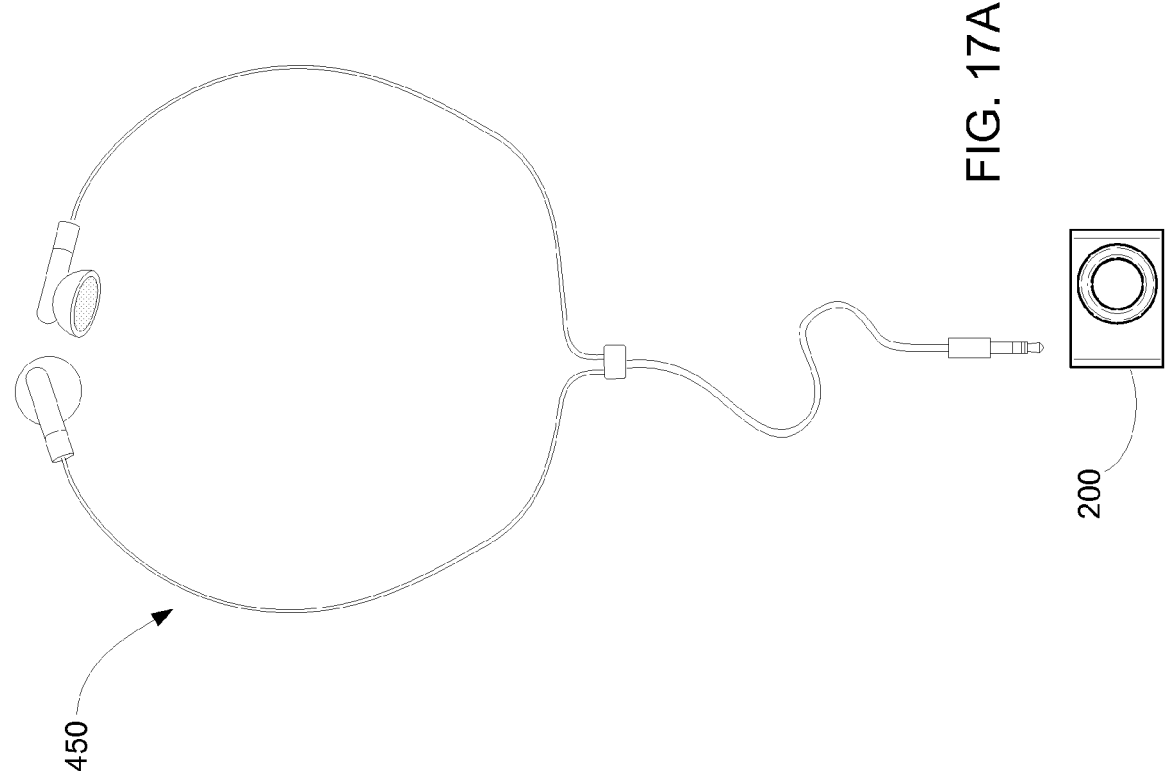
FIGS. 17A and 17B show two examples of media output devices that can be plugged into a media device according to one embodiment.
Figure 17B:
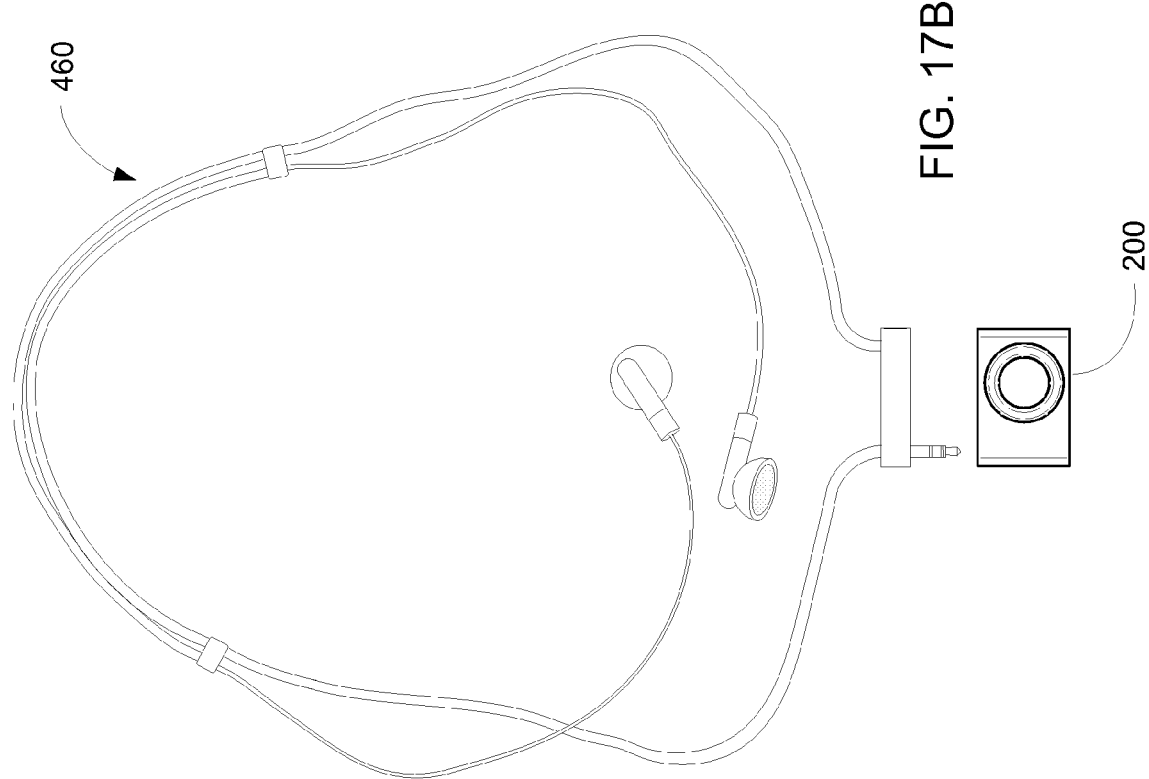

FIGS. 17A and 17B show examples of audio output devices 450 and 460 that can be used to listen to audio being outputted through the single integrated connector of the portable media device 200. FIG. 17A illustrates conventional output device that includes ear buds that connect to the media device via some wires and a male jack. On the other hand, FIG. 17B illustrates a lanyard style output device that includes ear buds, a neck cord that carries wires therethrough to the ear buds and a connector arrangement including a male audio jack. The lanyard may also include adjustable clasps for adjusting the size of the neck cord. As should be appreciated, the lanyard allows the media device to be word around the user's neck. An example of a lanyard can be found in U.S. patent application Ser. No. 11/212,514, which is herein incorporated by reference.

Figure 18:
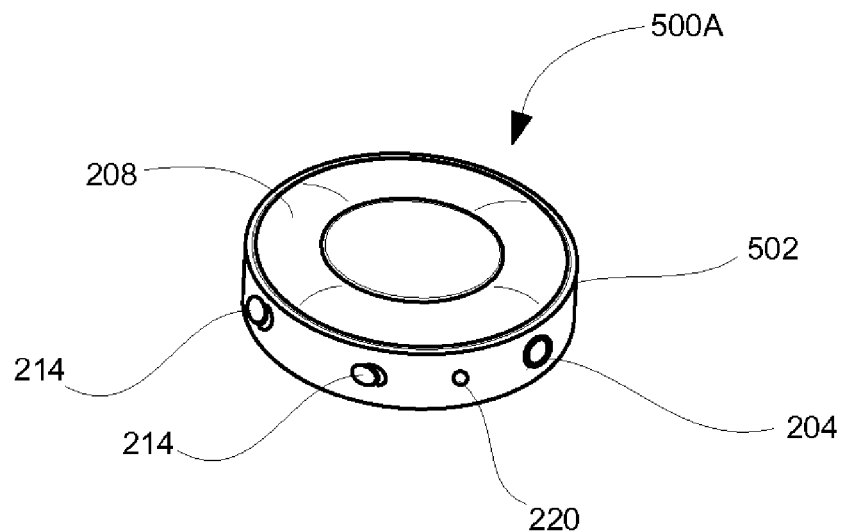
FIG. 18 is a perspective diagram of a portable media device according to an alternate embodiment of the invention.
Figure 19:
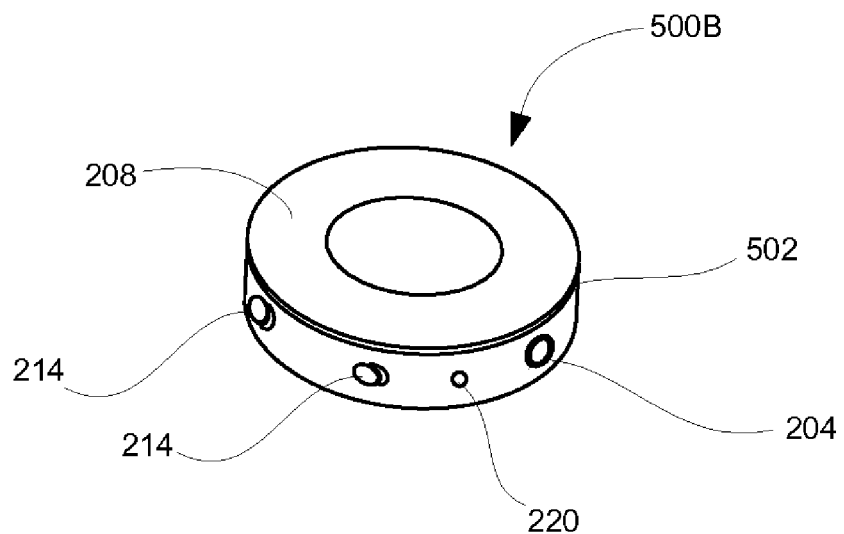
FIG. 19 is a perspective diagram of a portable media device according to an alternate embodiment of the invention.

FIGS. 18 and 19 show alternate embodiments of the portable media devices shown in previous embodiments. In these embodiments, the front housing of the media devices 500A and 500B have the same shape as the circular input arrangement thereby creating a circular media device. It is believed that a circular housing is much easier to hold, and can be treated similarly to old time pieces. Furthermore, this shape is enabled by the elimination of a display (displays are typically rectangular).

In one embodiment, the circular input arrangement 208 substantially fills the entire front surface of the media devices 500A and 500B. That is, the circular input arrangement 208 extends substantially edge to edge of the cylindrical housing 502 of the media devices 500A and 500B. In FIG. 18, the circular input arrangement 208 is at least in part contained within the cylindrical housing 502 (e.g., recessed), thus the edge of the circular input arrangement 208 extends between the side walls of the housing 502. In FIG. 19, the circular input arrangement 208 at least in part rests on the front surface of the housing 502 and has an outer peripheral shape that matches the outer peripheral shape of the cylindrical housing 502. Alternatively, in some cases it may be desirable to have the circular input arrangement 208 be smaller than the front surface of the cylindrical housing 502. In cases such as these, the circular input arrangement 208 may be recessed within the front surface or rest on a portion of the front surface thereby leaving some of the front surface exposed (at the peripheral front edge).

Although any circular input arrangement can be used in any of the embodiments described above, in FIG. 18, the media device 500A includes a circular input arrangement 208 similar to that described in FIG. 13. That is, it includes a tiltable outer ring and a depressible central button. However, FIG. 19 uses a slightly different circular input arrangement 208. In FIG. 19, the circular input arrangement 208 is embodied as a touch pad. The touch pad may be fixed or it may be a depressible touch pad set up similarly to the circular input arrangement described in FIG. 13. In either case, the touch pad can be broken up into button zones. Furthermore, the touch pad can be used to provide additional inputs. For example, swirling about the touch pad may adjust volume or be used to traverse a group of songs. Alternatively or additionally, the circular input arrangement may be rotatable. Examples of rotatable input arrangements, as well as touch pads, can be found in U.S. patent application Ser. Nos. 10/256,716, 10/188,182, 10/643,256 and 10/722,948, which are herein incorporated by reference.

Furthermore, as shown, like the embodiments previously described, the media devices may include switches 214, a single integrated connector 204 and various indicators 220. In most cases, these features are mounted on the side of the cylindrical housing 502 as shown. Buttons may alternatively be used to replace the switches.

Figure 20:
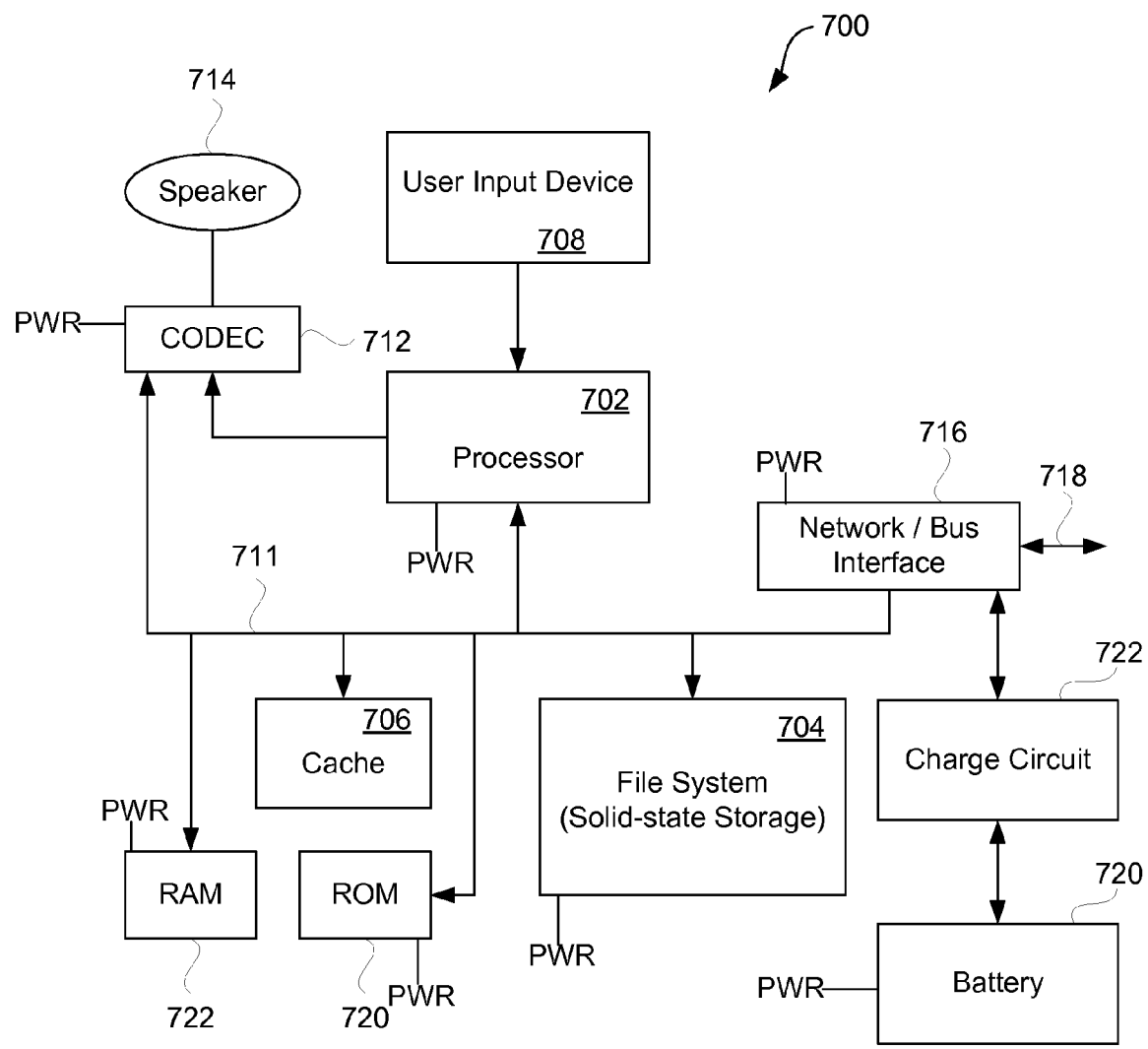
FIG. 20 is a block diagram of a media device according to one embodiment of the invention.

FIG. 20 is a block diagram of a media device 700 according to one embodiment of the invention. The media device 700 includes a processor 702 that pertains to a microprocessor or controller for controlling the overall operation of the media device 700. The media device 700 stores media data pertaining to media items in a file system 704 and a cache 706. The file system 704 is, typically, a solid-state storage medium. As an example, the solid-state storage medium can be FLASH memory. The file system 704 typically provides high capacity storage capability for the media device 700. The file system 704 can store not only media data but also non-media data.

When the media device 700 operates in a media play mode, the file system 704 can store and retrieve media files. In the media play mode, the media device 700 can be considered a media player. Alternatively, when the media device 700 operates in a data mode, the file system 704 can store and retrieve data files. In the data mode, the media device 700 can be referred to as a FLASH drive. However, since the access time to the file system 704 is relatively slow, the media device 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media device 700 is a portable media player that is powered by a battery (not shown). The media device 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The media device 700 also includes one or more user input devices 708 that allow a user of the media device 700 to interact with the media device 700. For example, the user input devices 708 can take a variety of forms, such as buttons, keypads, dials, switches, etc. A data bus 711 can facilitate data transfer between at least the file system 704, the cache 706, the processor 702, and the CODEC 712.

In one embodiment, the media device 700 serves to store a plurality of media assets (e.g., songs, photos, etc.) in the file system 704. When a user desires to have the media device 700 play a particular media asset, the user operates the user input device 708 to select a media player mode. Then, using the user input device 708, the user can play the next available media asset. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media device 700 or external to the media device 700. For example, headphones or earphones that connect to the media device 700 would be considered an external speaker.

Additionally, the media player may be set to a specific media play mode, according to some embodiments of the invention. The mode selection is typically made using the user input device 708, such as a switch or button. Two typical media play modes are a continuous play mode and a shuffle play mode. Generally, in the shuffle play mode, the media player plays through a list of media assets in a random order, while in the continuous play mode, the media player plays through the list of media assets according to a default order. The default order for the list of media assets can, for example, be (i) alphabetically ordered by song name, (ii) ordered by track position on an album, or (iii) ordered by date loaded onto the media player. In one embodiment of the invention, the media play mode is selected using a two-position switch, which allows a user of the media player to select between continuous play mode, and shuffle play mode.

The media device 700 also includes a network/bus interface 716 that couples to a data link 718. The data link 718 allows the media device 700 to couple to a host computer. The data link 718 can be provided over a wired connection or a wireless connection. In the case of a wireless connection, the network/bus interface 716 can include a wireless transceiver. In one embodiment, the media device 700 can include an axial jack connector coupled to the network/bus interface.

It should be noted that FIG. 20 does not indicate that the media device 700 includes a display (display screen). Although a conventional media player requires a display to enable a user to interface with the media player, the media device 700 shown in FIG. 20 does not include a display. By not providing a display, the media player is able to be smaller and lighter than conventional media players. A battery 720 that powers the various components of the media device 700 (at least when not attached to a power source or host computer is also able to be smaller since power consumption is reduced. The battery 720 can be rechargeable and charged by a charge circuit 722 using power available from the peripheral bus.

In one embodiment, to facilitate user interaction with the media device 700 (which lacks a display), the user input device 708 can include at least a shuffle switch. The shuffle switch enables a user to shuffle the media assets (e.g., songs) being played by the media device 700. The user input device 708 can also include a control input device that allows a user to signal a request to play, pause, next forward, next back, disable control inputs temporarily, and reshuffle the media assets.

Figure 21:
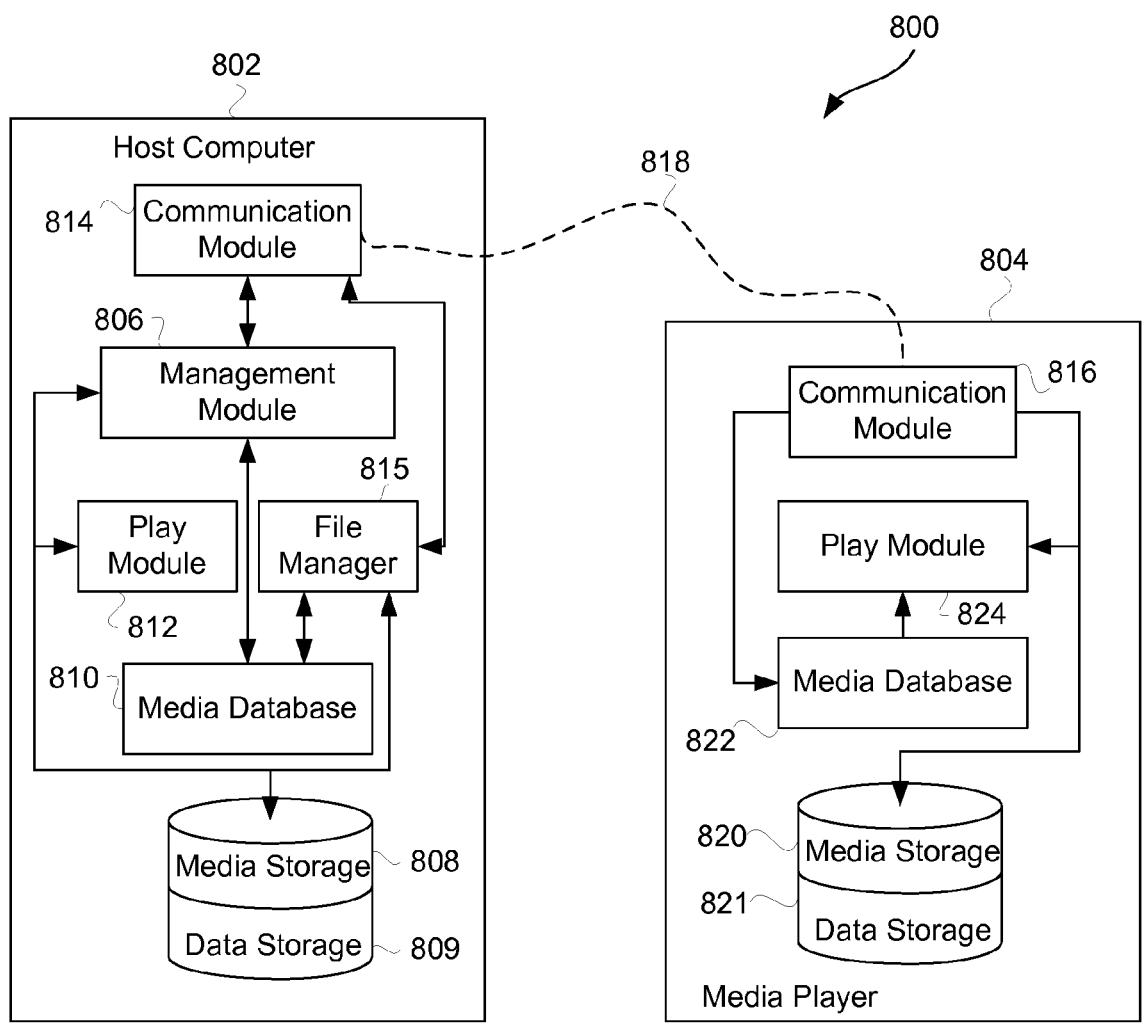
FIG. 21 is a block diagram of a media management system according to one embodiment of the invention.

FIG. 21 is a block diagram of a media management system 800 according to one embodiment of the invention. The media management system 800 includes a host computer 802 and a media player 804. The media player can be, for example, the media player 700 of FIG. 20. The host computer 802 is typically a personal computer. The host computer, among other conventional components, includes a management module 806, which is a software module. The management module 806 provides for centralized management of media assets (and/or playlists) not only on the host computer 802 but also on the media player 804. More particularly, the management module 806 manages those media assets stored in media storage 808 associated with the host computer 802. The management module 806 also interacts with a media database 810 to store media information associated with the media assets stored in media storage 808. Some embodiments also include a file manager 815, which provides for management of other data files (i.e., non-media asset files) on both the host computer 802 and the media player 804.

The media information pertains to characteristics or attributes of the media assets. For example, in the case of audio or audiovisual media, the media information can include one or more of: title, album, track, artist, composer and genre. These types of media information are specific to particular media assets. In addition, the media information can pertain to quality characteristics of the media assets. Examples of quality characteristics of media assets can include one or more of: bit rate, sample rate, equalizer setting, volume adjustment, start/stop and total time.

Further, in some embodiments, the management module 806 also interacts with the host computer 802 to transfer data files (i.e., non-media asset files stored on the host computer 802, typically on the host computer's hard drive) to and from media storage 808. Alternately, in some embodiments, data files may be transferred to and from optional data storage 809, which may be physically and/or logically combined with or separate from media storage 808. It is understood that a data file includes any data that is capable of being stored in a file system, which includes all file types. Typical data files include text documents, executable files, and graphics files. Alternately, in some embodiments, the management module 806 does not directly access data files. Rather, the user transfers files back and forth to/from or deletes files from the media player 804 using the file manager 815, on the host computer, where the media player appears, for example, as a disk drive or removable storage medium.

The data storage 809 and/or the media storage 808 can utilize one or more directories (e.g., folders) in the host computer's file system (e.g., on a hard drive, not shown). As is conventional, data stored on the data storage 809 can be assessed by a file manager 815. In addition, in one embodiment, media assets stored in the media storage 808 can also be accessed by the file manager 815.

Still further, the host computer 802 includes a play module 812. The play module 812 is a software module that can be utilized to play certain media assets stored in media storage 808. In some embodiments, the play module 812 can also be used to play media assets stored outside of media storage 808, such as media assets stored in data storage 820 on the media player 804.

The host computer 802 also includes a communication module 814 that couples to a corresponding communication module 816 within the media player 804. A connection or link 818 removeably couples the communication modules 814 and 816. In one embodiment, the connection or link 818 is a cable and/or docking station that provides a data bus, such as a FIREWIRE® bus or USB bus, which is well known in the art. In another embodiment, the connection or link 818 is a wireless channel or connection through a wireless network. In still another embodiment, the connection or link 818 is a connection established by direct coupling of a connector on the media player 804 to a connector on the host computer 802. In this embodiment, the media player 804 is directly coupled to the host computer 802 without using a cable or docking station. Hence, depending on implementation, the communication modules 814 and 816 may communicate in a wired or wireless manner.

The media player 804 also includes media storage 820 that stores media assets within the media player 804. Optionally, media storage 820 can also store data files in data storage 821. The media assets or data files being stored to media asset storage 820 or data storage 821 are typically received over the connection or link 818 from the host computer 802. More particularly, the management module 806 sends all or certain of those media assets or data files residing in media storage 808 or file storage 809 over the connection or link 818 to media storage 820 or file storage 821 within the media player 804. Additionally, the corresponding media information for the media assets that is also delivered to the media player 804 from the host computer 802 can be stored in a media database 822. In this regard, certain media information from the media database 810 within the host computer 802 can be sent to the media database 822 within the media player 804 over the connection or link 818. Still further, playlists identifying certain of the media assets can also be sent by the management module 806 over the connection or link 818 to media storage 820 or the media database 822 within the media player 804.

Furthermore, the media player 804 includes a play module 824 that couples to media storage 820 and the media database 822. The play module 824 is a software module that can be utilized to play certain media assets stored in media storage 820.

Hence, in one embodiment, the media player 804 has limited or no capability to manage media assets or data files on the media player 804. However, the management module 806 within the host computer 802 can indirectly manage the media assets residing on the media player 804. For example, to "add" a media asset to the media player 804, the management module 806 serves to identify the media asset to be added to the media player 804 from media storage 808 and then causes the identified media asset or data to be delivered to the media player 804. As another example, to "delete" a media asset from the media player 804, the management module 806 serves to identify the media asset to be deleted from media storage 808 and then causes the identified media asset to be deleted from the media player 804. As still another example, if changes (i.e., alterations) to characteristics of a media asset were made at the host computer 802 using the management module 806, then such characteristics can also be carried over to the corresponding media asset on the media player 804. In one implementation, the additions, deletions and/or changes occur in a batch-like process during synchronization of the media assets on the media player 804 with the media assets on the host computer 802.

Alternately, in some embodiments, data storage on the media player 804 is designated file storage 821 and is combined with or physically and/or logically separate from media storage 820. As discussed above, in some embodiments, the management module 806 is normally not involved in transferring data between file storage 809 on the host computer 802 and file storage 821 on the media player 804. In these embodiments, the file manager 815 running on the host computer 802 can be used to manage the transfer of data between file storage 809 and file storage 821. For example, when using the file manager 815, the media player 804 appears as a flash drive and data files are accessed as if the media player 804 was a conventional flash drive.

In another embodiment, the media player 804 has limited or no capability to manage playlists on the media player 804. However, the management module 806 within the host computer 802 through management of the playlists residing on the host computer can indirectly manage the playlists residing on the media player 804. In this regard, additions, deletions or changes to playlists can be performed on the host computer 802 and then be carried over to the media player 804 when delivered thereto.

As previously noted, synchronization is a form of media management. The ability to automatically initiate synchronization was also previously discussed above and in the related application noted above. Still further, however, the synchronization between devices can be restricted so as to prevent automatic synchronization when the host computer and media player do not recognize one another.

In one implementation, the host computer can utilize an application resident on the host computer to permit utilization and provide management for playlists. One such application is iTunes®, produced by Apple Inc. of Cupertino, Calif.

Although the media items (or media assets) of emphasis in several of the above embodiments were audio items (e.g., audio files or songs), the media items are not limited to audio items. For example, the media items can alternatively pertain to videos (e.g., movies) or images (e.g., photos).

The various aspects, features, embodiments or implementations of the invention described above can be used alone or in various combinations.

The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random-access memory, CD-ROMs, Flash memory cards, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described.

Hence, all suitable modifications and equivalents may be resorted to as falling within the scope of the invention.

The invention claimed is:

1. A portable media player, comprising:
   a housing with a front surface and a back surface;
   a memory disposed within the housing, the memory being configured to store a plurality of digital media assets and data files;
   a media control input arrangement located at the front surface of the housing, the media control input arrangement enabling a user of the portable media player to select at least one of the digital media assets to be presented;
   an integrated attachment mechanism located at the back surface of the housing, the portable media player being wearable through the use of the attachment mechanism, wherein the attachment mechanism is a clip, the clip including a platform that moves between a closed position where an article is trapped between the platform and the housing thus securing the media player to the article, and an open position where the article is released from engagement between the platform and the housing thus freeing the media player from the article, wherein the platform is coupled to the housing via a hinge mechanism that is internal to the housing.

2. The portable media player as recited in claim 1 wherein the platform pivots relative to the back surface of the housing.

3. The portable media player as recited in claim 2 wherein the platform is spring biased in the closed position.

4. The portable media player as recited in claim 2 wherein the platform is spaced away from the back surface of the housing via a raised section of the housing, and wherein the hinge mechanism is disposed within the raised section.

5. The portable media player as recited in claim 4 wherein the raised section extends edge to edge of the housing.

6. The portable media player as recited in claim 4 wherein the raised section is rounded.

7. The portable media player as recited in claim 4 wherein the platform includes a shoulder that protrudes from the bottom of the platform, the raised section includes an opening for receiving a shoulder of the platform internally within the housing, and the walls of the opening and the shoulder include through holes for receiving a pivot pin, thereby allowing the platform to rotate about the pivot pin.

8. The portable media player as recited in claim 2 wherein the platform and back surface of the housing each include teeth that engage one another in the closed position, the teeth being disposed at the opposite end of the hinge mechanism.

9. The portable media player as recited in claim 1 wherein the portable media player has no display.

10. The portable media player as recited in claim 1 wherein the portable media player is palm sized or smaller.

11. The portable media player as recited in claim 1 wherein a plurality of digital media assets are associated with a media list and wherein the at least one media asset selected for presentation is chosen from the media asset list.

12. The portable media player as recited in claim 1 wherein the memory is non volatile memory.

13. The portable media player as recited in claim 12 wherein the memory is FLASH memory.

14. The portable media player as recited in claim 1 further comprising a controller operatively coupled to the memory and the media player input arrangement, the controller operating to play the selected at least one media asset.

15. A portable media player that does not have a display, comprising:
   a housing with a front surface and a back surface, the back surface including no I/O components;
   a non volatile memory disposed within the housing, the non volatile memory being configured to store a plurality of digital media assets and data files;
   a single media control input arrangement located at the front surface of the housing, the media control input arrangement enabling a user of the portable media player to control various aspects of the portable media player;
   an integrated clip, the clip including a platform that is pivotally coupled to a rounded raised section of the housing via an internal hinge mechanism, the platform rotating between a closed position where an article is trapped between the platform and the housing thus securing the media player to the article, and an open position where the article is released from engagement between the platform and the housing thus freeing the media player from the article, wherein the platform is coupled to the housing via a hinge mechanism that is internal to the housing; and
   a controller operatively coupled to the memory and the media player input arrangement, the controller operating to play the selected at least one media asset.

16. The portable media player as recited in claim 15 wherein the media player has a base volume of less than 15,000 mm3, base dimensions less than 50 mm×30 mm×10 mm, and a weight less than 20 grams.

17. The portable media player as recited in claim 15 wherein the media player has a base volume of less than 8,230 mm3, base dimensions less than 41.2 mm×27.3 mm×6 mm, and a weight less than 16 grams.

18. The portable media player as recited in claim 15 wherein the media player has a base volume of less than 7735 mm3, base dimensions less than 41.2 mm×27.3 mm×6 mm, and a weight less than 16 grams.

19. The portable media player as recited in claim 15 wherein the media player has a base volume of less than 4,500 mm3, base dimensions less than 27.3 mm×27.3 mm×6 mm, and a weight less than 16 grams.

20. The portable media player as recited in claim 15 wherein the media control input arrangement substantially fills the entire planar front surface of the media player.

21. The portable media player as recited in claim 15 wherein the ratio of front surface area to area of the media control input arrangement is less than 3:1.

22. The portable media player as recited in claim 15 wherein the ratio of front surface area to area of the media control input arrangement is less than 2:1.

23. The portable media player as recited in claim 15 wherein the ratio of front surface area to area of the media control input arrangement is about 1:1.

24. The portable media player as recited in claim 15 wherein the ratio of front surface area to area of the media control input arrangement is between about 2.85:1 to about 2.3:1.

25. The portable media player as recited in claim 15 wherein the media control input arrangement is integrated into a single device.

26. The portable media player as recited in claim 15 wherein the media control input arrangement is a circular input arrangement.

27. The portable media player as recited in claim 26 wherein the circular input arrangement has a diameter less than 30 mm.

28. The portable media player as recited in claim 26 wherein the circular input arrangement has a diameter between about 20 and 27.3 mm.

29. The portable media player as recited in claim 26 wherein the circular input arrangement is about 23 mm.

30. The portable media player as recited in claim 15 wherein the media control arrangement is embodied as a clickable button actuator including a plurality of buttons provided in a circular arrangement around a center button.

31. The portable media player as recited in claim 15 wherein the media control input arrangement includes controls selected from play, pause, rewind, fast forward, skip to previous media asset, skip to next media asset, volume up, and volume down.

32. The portable media player as recited in claim 15 wherein the shape of the housing matches the shape of the media control input arrangement.

33. The portable media player as recited in claim 32 wherein the housing is cylindrical and the front and back surfaces are circular, and wherein the media control input arrangement is a circular input arrangement.

34. The portable media player as recited in claim 15 wherein the media control input arrangement extends substantially edge to edge of the housing.

35. The portable media player as recited in claim 15 further comprising a switch arrangement configured to select a media play mode, the switch arrangement being located on a side surface of the housing.

36. The portable media player as recited in claim 35 wherein the play mode is one of a continuous play mode and a shuffle play mode.

37. The portable media player as recited in claim 15 further comprising one or more indicators that provide user feedback or status information for the portable media player, the indicators being located on a side surface of the housing.

38. The portable media player as recited in claim 15 wherein the volume of the housing is less than or equal to 8230 mm3, the base dimensions of the housing are less than or equal to 41.2 mm×27.3 mm×6 mm, the diameter of the rounded raised section of the housing is about 3 mm, the surface area of the platform is similar to the surface area of the back surface of the housing and the platform has a thickness of about 1 mm, the media player having an overall size of about 41.2 mm×27.3 mm×10 mm.

39. A portable media player, comprising:
a housing;
a single integrated connector port extending into the housing, the single integrated connector port being the only portal for distributing data, power and media to and from the portable media player, wherein the single integrated connector is a female jack that receives a male plug along a connection axis, and wherein the female jack includes an axial opening and axially spaced terminals disposed within the axial opening for enabling its multiple functions, wherein the female jack is configured for receiving an integrated plug that includes multiple functionality;
a memory module disposed within the housing and configured to store data files and a plurality of digital media assets, the data files and a plurality of digital media assets being transferred through the single integrated connector port;
a media module disposed within the housing and configured to provide media operations on the portable media player, the media module cooperating with the non volatile electronic memory device to retrieve media assets therefrom, the media module presenting the media assets to a user of the portable electronic device through the single integrated connector port;
a power module disposed within the housing and configured to control power operations of the portable media player for the purpose of powering or charging the portable media player, the power module receiving power through the single integrated connector port.

40. The portable media player as recited in claim 39 wherein the single integrated connector port is not an elongated connector port including laterally spaced side by side contacts.

41. The portable media player as recited in claim 39 wherein the single integrated connector port is not a USB or Firewire port.

42. The portable media player as recited in claim 39 wherein the female jack is configured to receive a male audio plug, a male data plug, or a male power plug.

43. The portable media player as recited in claim 39 wherein the female jack includes a connector body in which the axial opening is formed, and where the various terminals are mounted.

44. The portable media player as recited in claim 43 wherein the female jack further comprises contact pins that pass through the connector body from the axial opening to the edge of the connector body, the internal circuitry of the media player connecting to the female jack at the contact pins.

45. The portable media player as recited in claim 39 wherein the female jack includes two data terminals (+, −), a ground, a voltage (+5 v) and a plug detect terminal.

46. The portable media player as recited in claim 45 wherein the two data terminals are shared for different modes of operation, the two data terminals helping transfer data when the portable media player is in a data transfer mode, the two data terminals helping output audio when the portable media player is in an audio output mode.

47. The portable media player as recited in claim 39 further comprising a rechargeable battery disposed within the housing and configured to provide power to the portable media player as necessary at least when disconnected from a power source, wherein the rechargeable battery is configured to be charged through the power transmitted through the single integrated connector port.

48. A docking system, comprising:
a portable media player, the portable media player including a housing having a front surface, side surfaces, and a back surface, a single media control input arrangement located at the front surface of the housing, a single integrated connector port located at a side surface of the housing and an integrated clip mounted at the back surface of the housing, the clip including a platform that is spaced apart from the back surface thereby creating a void there between, wherein the platform is coupled to the housing via a hinge mechanism that is internal to the housing; and
a docking station, the docking station including a base with a slot partially recessed within the top surface of the base, the recess being configured to receive an end of the portable media player that includes the single integrated connector port, the inner peripheral surface of the recess being sized and dimensioned to receive the outer peripheral surface of the portable media player including the front surface of the housing and the outer surface of the platform, the docking station also including a single integrated connector plug that engages the single integrated connector port when the portable media player is placed in the recess of the docking station, the interface between the connector port and the connector plug being configured for distributing data, power and media.

49. The docking system as recited in claim 48 wherein the docking station further includes a guide post disposed inside the recess, the guide post extending into the void disposed between the back surface of the housing and the inside surface of the platform when the portable media player is inserted into the recess.

50. The docking system as recited in claim 48 wherein the docking station is a stand alone unit.

51. The docking system as recited in claim 48 wherein the docking station is integrated within an electronic device.

52. A portable electronic device capable of operating as a removable storage medium when connected to a host computing device, and configured to operate as a media player when disconnected from the host computing device, comprising:
- a housing with a front surface, first side surface, second side surface and a back surface;
- a non volatile memory disposed within the housing, the memory being configured to store a plurality of digital audio assets and data files;
- a rechargeable battery disposed within the housing and configured to provide power to the portable media player as necessary at least when disconnected from a power source;
- a single integrated media control input arrangement located at the front surface of the housing, the media control arrangement being embodied as a clickable button actuator including a plurality of integrated outer buttons provided in a circular arrangement around a center button, the center button initiating play/pause, the outer buttons including buttons for initiating skip to previous media asset, skip to next media asset, volume up and volume down;
- a switch arrangement located at the first side surface, the switch arrangement being configured to at least select a media play mode, the play mode being one of a continuous play mode and a shuffle play mode;
- a single integrated connector located at the second side surface, the single integrated connector including capabilities for transferring digital media assets and data files between the portable media player and a host, transmitting power to the portable media player from a power source, and outputting digital audio assets for listening enjoyment, wherein the single integrated connector is a female jack that receives a male plug along a connection axis, and wherein the female jack includes an axial opening and axially spaced terminals disposed within the axial opening for enabling its multiple functions, wherein the female jack is configured for receiving an integrated plug that includes multiple functionality;
- one or more indicators located on the side surfaces of the housing, the indicators providing user feedback or status information for the portable media player, the portable media player not including a display;
- a controller operatively coupled to the memory, media player input arrangement, switch arrangement, connector and indicators, the controller operating to play the selected at least one media asset; and
- a clip integrated with the housing and located at the back surface of the housing, the portable media player being wearable through the use of the clip, the clip including a platform having substantially the same profile as the back surface of the housing, the clip including a platform attached to the back surface and moving between an open position where an article of clothing can be positioned for entrapment, and closed position where the article of clothing is trapped between the platform and the back surface of the housing thereby securing the portable media player to the article of clothing.

* * * * *